US012482385B2

(12) United States Patent
Jung

(10) Patent No.: US 12,482,385 B2
(45) **Date of Patent: *Nov. 25, 2025**

(54) SENSING DRIVER, METHOD OF DRIVING THE SAME, AND DISPLAY DEVICE INCLUDING THE SAME

(71) Applicant: Samsung Display Co., Ltd., Yongin-Si (KR)

(72) Inventor: Hayong Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 8 days.

This patent is subject to a terminal disclaimer.

(21) Appl. No.: 18/583,781

(22) Filed: Feb. 21, 2024

(65) Prior Publication Data

US 2025/0078700 A1 Mar. 6, 2025

(30) Foreign Application Priority Data

Aug. 31, 2023 (KR) ........................ 10-2023-0115552

(51) Int. Cl.
*G09G 3/00* (2006.01)
*G09G 3/32* (2016.01)
*G09G 3/3258* (2016.01)

(52) U.S. Cl.
CPC ............... *G09G 3/006* (2013.01); *G09G 3/32* (2013.01); *G09G 3/3258* (2013.01); *G09G 2300/0819* (2013.01); *G09G 2300/0852* (2013.01); *G09G 2320/045* (2013.01); *G09G 2330/12* (2013.01)

(58) Field of Classification Search
CPC ........ G09G 3/006; G09G 3/32; G09G 3/3258; G09G 2300/0819; G09G 2300/0852; G09G 2320/045; G09G 2330/12; G09G 3/3233; G09G 3/20; G09G 3/3208; G09G 2320/02; G09G 2320/0233; G09G 2320/0626
See application file for complete search history.

(56) References Cited

U.S. PATENT DOCUMENTS 11,915,650 B2 * 2/2024 Jung .................... G09G 3/3233
12,159,007 B1 * 12/2024 Huang ................ G06F 3/04182
2015/0130780 A1 * 5/2015 Kwon .................. G09G 3/3233
345/82
2023/0317001 A1 10/2023 Jung et al.

FOREIGN PATENT DOCUMENTS

KR 10-2023-0143252 A 10/2023

* cited by examiner

*Primary Examiner* — Amit Chatly
(74) *Attorney, Agent, or Firm* — Innovation Counsel LLP

(57) ABSTRACT

A sensing driver includes a sensing channel which samples a first sensing voltage of a first sensing line in a first sampling period, samples a second sensing voltage of a second sensing line in a second sampling period, and includes a sampling capacitor, a first line selection switch which connects the first sensing line to the sensing channel in a first sub-sensing period, and a second line selection switch which connects the second sensing line to the sensing channel in a second sub-sensing period. A voltage having a first initialization level is applied to a first electrode of the sampling capacitor in a first capacitor initialization period, and a voltage having a second initialization level different from the first initialization level is applied to the first electrode of the sampling capacitor in a second capacitor initialization period.

23 Claims, 24 Drawing Sheets

SENSING DRIVER, METHOD OF DRIVING THE SAME, AND DISPLAY DEVICE INCLUDING THE SAME

CROSS-REFERENCE TO RELATED APPLICATION(S)

This application claims priority under 35 USC § 119 to Korean Patent Application No. 10-2023-0115552 filed on Aug. 31, 2023, in the Korean Intellectual Property Office (KIPO), the entire disclosure of which is incorporated by reference herein.

BACKGROUND

1. Field

Embodiments relate to a sensing driver of a display device. More particularly, embodiments related to a sensing driver performing a sensing operation on sensing lines, a method of driving the sensing driver, and a display device including the sensing driver.

2. Description of the Related Art

A display device may include a plurality of pixels. Each of the pixels may include a driving transistor that generates a driving current and a light emitting element that emits light based on the driving current.

Although the pixels are manufactured by the same process, the driving transistors may have different driving characteristics (e.g., threshold voltages), and accordingly, the pixels may emit light with different luminance. Further, as the driving time of the display device accumulates, the pixels may deteriorate, and the driving characteristics of the driving transistors may deteriorate.

To compensate for luminance unevenness and deterioration of the pixels, the display device may include a sensing driver that performs a sensing operation to sense the driving characteristics of the driving transistors of the pixels. In order to reduce the size of the sensing driver, the sensing driver may perform a sensing operation on two or more sensing lines using one sensing channel.

SUMMARY

Embodiments provide a sensing driver for improving sensing accuracy.

Embodiments provide a method of driving the sensing driver for improving sensing accuracy.

Embodiments provide a display device including the sensing driver for improving sensing accuracy.

A sensing driver which performs a sensing operation on a first sensing line and a second sensing line in a sensing period including a first sub-sensing period and a second sub-sensing period according to embodiments may include a sensing channel which samples a first sensing voltage of the first sensing line in a first sampling period of the first sub-sensing period, samples a second sensing voltage of the second sensing line in a second sampling period of the second sub-sensing period, and includes a sampling capacitor having a first electrode and a second electrode, a first line selection switch which connects the first sensing line to the sensing channel in the first sub-sensing period, and a second line selection switch which connects the second sensing line to the sensing channel in the second sub-sensing period. A voltage having a first initialization level may be applied to the first electrode of the sampling capacitor in a first capacitor initialization period of the first sub-sensing period. A voltage having a second initialization level different from the first initialization level may be applied to the first electrode of the sampling capacitor in a second capacitor initialization period of the second sub-sensing period.

In an embodiment, the second initialization level may be higher than the first initialization level.

In an embodiment, the second initialization level may be preset before the sensing period.

In an embodiment, the second initialization level may be set based on the first sensing voltage and the second sensing voltage.

In an embodiment, the sensing channel may further include a first sampling switch which connects the first and second selection switches to the first electrode of the sampling capacitor in response to a sampling signal, a first reference switch which applies a reference voltage to the second electrode of the sampling capacitor in response to a reference signal, a first initialization voltage switch which applies an initialization voltage to a first intermediate node in response to a first capacitor initialization signal, and a first capacitor initialization switch which connects the first intermediate node to the first electrode of the sampling capacitor in response to the reference signal.

In an embodiment, the sensing driver may further include a reference channel. The reference channel may include a reference capacitor which has a first electrode and a second electrode, a second sampling switch which applies the initialization voltage to the first electrode of the reference capacitor in response to the sampling signal, a second reference switch which applies the reference voltage to the second electrode of the reference capacitor in response to the reference signal, a second initialization voltage switch which applies the initialization voltage to a second intermediate node in response to the first capacitor initialization signal, and a second capacitor initialization switch which connects the second intermediate node to the first electrode of the reference capacitor in response to the reference signal.

In an embodiment, the initialization voltage may have a first voltage level in the first capacitor initialization period, and may have a second voltage level different from the first voltage level in the second capacitor initialization period.

In an embodiment, the sensing channel may further include a first reference voltage switch which applies the reference voltage to the first intermediate node in response to a second capacitor initialization signal. The reference channel may further include a second reference voltage switch which applies the reference voltage to the second intermediate node in response to the second capacitor initialization signal.

In an embodiment, the reference voltage may have a third voltage level in the first capacitor initialization period, and may have a fourth voltage level different from the third voltage level in the second capacitor initialization period.

In an embodiment, the sensing channel may further include a first external voltage switch which applies an external voltage to the first intermediate node in response to a third capacitor initialization signal. The reference channel may further include a second external voltage switch which applies the external voltage to the second intermediate node in response to the third capacitor initialization signal.

In an embodiment, the external voltage may have a fifth voltage level in the first capacitor initialization period, and may have a sixth voltage level different from the fifth voltage level in the second capacitor initialization period.

In an embodiment, the sensing driver may further include a sensing line initialization circuit which simultaneously initializes the first sensing line and the second sensing line in the first sub-sensing period.

In an embodiment, the sensing driver may further include an analog-to-digital converter, and a switch matrix which connects the sensing channel to the analog-to-digital converter.

In an embodiment, the sensing period may include the first sub-sensing period in which a first sensing operation on the first sensing line is performed, the second sub-sensing period in which a second sensing operation on the second sensing line is performed, and a data output period in which first sensing data corresponding to the first sensing voltage and second sensing data corresponding to the second sensing voltage is output. The first sub-sensing period may include a sensing line initialization period in which the first sensing line and the second sensing line are simultaneously initialized, the first capacitor initialization period in which the sampling capacitor is initialized, the first sampling period in which the first sensing voltage is sampled, and a first analog-to-digital conversion period in which the first sensing voltage is converted into the first sensing data. The second sub-sensing period may include the second capacitor initialization period in which the sampling capacitor is initialized, the second sampling period in which the second sensing voltage is sampled, and a second analog-to-digital conversion period in which the second sensing voltage is converted into the second sensing data.

In an embodiment, the sensing driver may perform a sensing operation on N odd-numbered sensing lines, where N is a natural number greater than or equal to 2, including the first sensing line and N even-numbered sensing lines including the second sensing line in the sensing period. The sensing driver may include N sensing channels which include the sensing channel, N first line selection switches which connect the N odd-numbered sensing lines to the N sensing channels in the first sub-sensing period, N second line selection switches which connect the N even-numbered sensing lines to the N sensing channels in the second sub-sensing period, an analog-to-digital converter, and a switch matrix which sequentially connects the N sensing channels to the analog-to-digital converter in a first analog-to-digital conversion period of the first sub-sensing period, and sequentially connects the N sensing channels to the analog-to-digital converter in a second analog-to-digital conversion period of the second sub-sensing period. The analog-to-digital converter may sequentially convert N first sensing voltages of the N odd-numbered sensing lines into N first sensing data in the first analog-to-digital conversion period, and may sequentially convert N second sensing voltages of the N even-numbered sensing lines into N second sensing data in the second analog-to-digital conversion period.

In an embodiment, the second initialization level may be set as an average of the N first sensing voltages and the N second sensing voltages.

In an embodiment, the sensing driver may further include a data output unit which sequentially stores the N first sensing data in the first analog-to-digital conversion period, sequentially stores the N second sensing data in the second analog-to-digital conversion period, and outputs the N first sensing data and the N second sensing data in a data output period of the sensing period.

In an embodiment, the data output unit may rearrange the N first sensing data and the N second sensing data such that each of the N second sensing data is disposed between adjacent two of the N first sensing data.

A method of driving a sensing driver which performs a sensing operation on a first sensing line and a second sensing line in a sensing period including a first sub-sensing period and a second sub-sensing period according to embodiments may include connecting the first sensing line to a sensing channel in the first sub-sensing period, applying a voltage having a first initialization level to a first electrode of a sampling capacitor of the sensing channel in a first capacitor initialization period of the first sub-sensing period, sampling a first sensing voltage of the first sensing line in a first sampling period of the first sub-sensing period, applying a voltage having a second initialization level different from the first initialization level to the first electrode of the sampling capacitor in a second capacitor initialization period of the second sub-sensing period, connecting the second sensing line to the sensing channel in the second sub-sensing period, and sampling a second sensing voltage of the second sensing line in a second sampling period of the second sub-sensing period.

In an embodiment, the second initialization level may be higher than the first initialization level.

In an embodiment, the second initialization level may be preset before the sensing period.

In an embodiment, the second initialization level may be set based on the first sensing voltage and the second sensing voltage.

A display device according to embodiments may include a display panel which includes a first pixel and a second pixel, a scan driver which provides a scan signal and a sensing signal to each of the first and second pixels, a data driver which provides a data signal to each of the first and second pixels, and a sensing driver which performs a sensing operation on a first sensing line connected to the first pixel and a second sensing line connected to the second pixel in a sensing period including a first sub-sensing period and a second sub-sensing period. The sensing driver may include a sensing channel which samples a first sensing voltage of the first sensing line in a first sampling period of the first sub-sensing period, samples a second sensing voltage of the second sensing line in a second sampling period of the second sub-sensing period, and includes a sampling capacitor, a first line selection switch which connects the first sensing line to the sensing channel in the first sub-sensing period, and a second line selection switch which connects the second sensing line to the sensing channel in the second sub-sensing period. A voltage having a first initialization level may be applied to a first electrode of the sampling capacitor in a first capacitor initialization period of the first sub-sensing period. A voltage having a second initialization level different from the first initialization level may be applied to the first electrode of the sampling capacitor in a second capacitor initialization period of the second sub-sensing period.

In the sensing driver, the method of driving the sensing driver, and the display device according to the embodiments, the second initialization level of the voltage that initializes the sampling capacitor in the second sub-sensing period may be different from the first initialization level of the voltage that initializes the sampling capacitor in the first sub-sensing period, so that an offset between the first sensing data and the second sensing data may be reduced. Accordingly, the sensing accuracy of the sensing driver may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
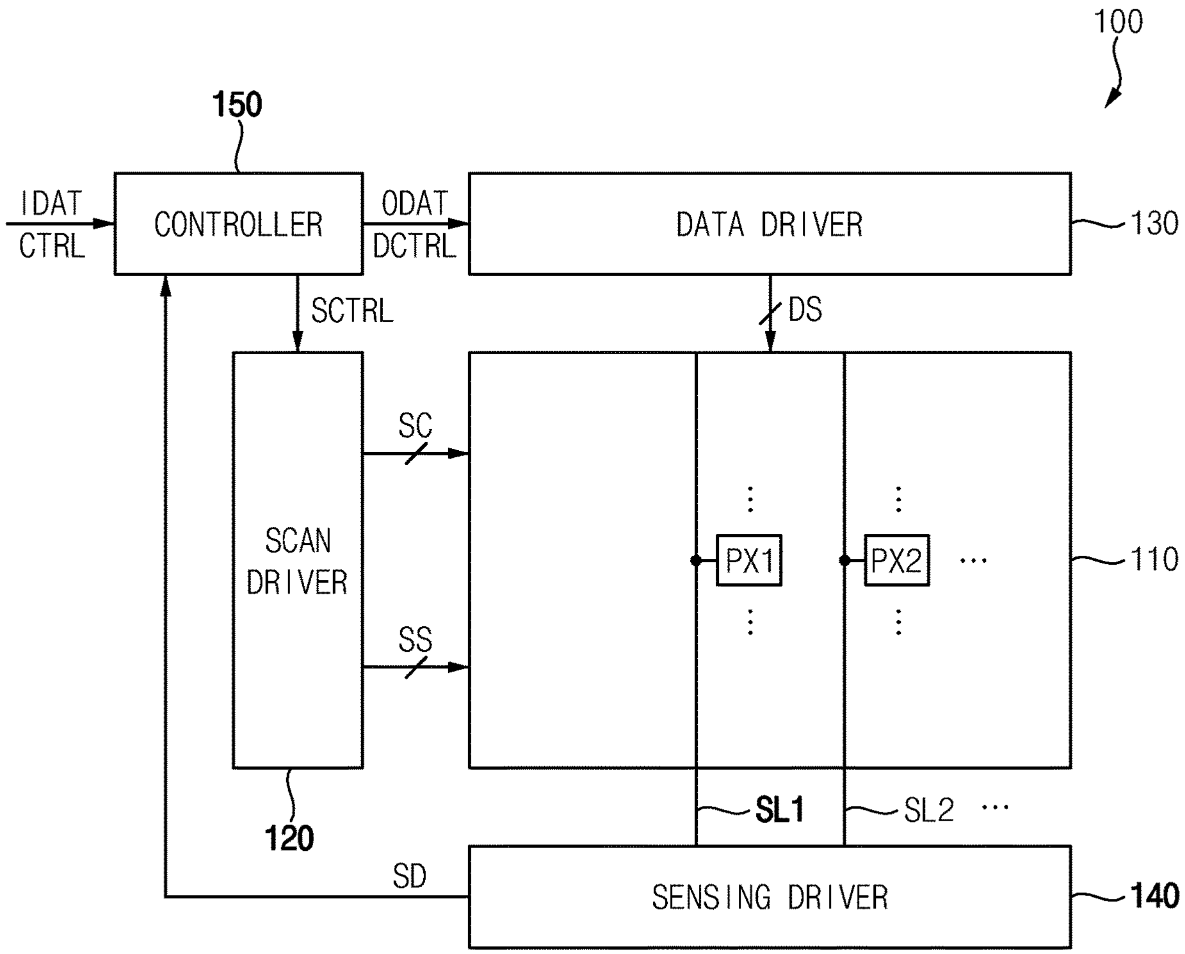
FIG. 1 is a block diagram showing a display device according to an embodiment of the present disclosure.

Hereinafter, a sensing driver, a method of driving a sensing driver, and a display device according to embodiments of the present disclosure will be described in more detail with reference to the accompanying drawings. The same or similar reference numerals will be used for the same elements in the accompanying drawings.

FIG. 1 is a block diagram showing a display device 100 according to an embodiment of the present disclosure.

Referring to FIG. 1, the display device 100 may include a display panel 110 including a plurality of pixels PX1 and PX2, a scan driver 120 that provides a scan signal SC and a sensing signal SS to each of the plurality of pixels PX1 and PX2, a data driver 130 that provides a data signal DS to each of the plurality of pixels PX1 and PX2, a sensing driver 140 connected to the plurality of pixels PX1 and PX2 through a plurality of sensing lines SL1 and SL2, and a controller 150 that controls the scan driver 120, the data driver 130, and the sensing driver 140.

The display panel 110 may include a plurality of data lines, a plurality of scan lines, a plurality of sensing signal lines, the plurality of sensing lines SL1 and SL2, and the plurality of pixels PX1 and PX2 connected thereto. In an embodiment, each of the plurality of pixels PX1 and PX2 may include a light emitting element, and the display panel 110 may be a light emitting display panel. For example, the light emitting element may be an organic light emitting diode (OLED), and the display panel 110 may be an OLED display panel. For example, the light emitting element may be a nano light emitting diode (NED), a quantum dot (QD) light emitting diode, a micro light emitting diode, or an inorganic light emitting diode.

Figure 2:
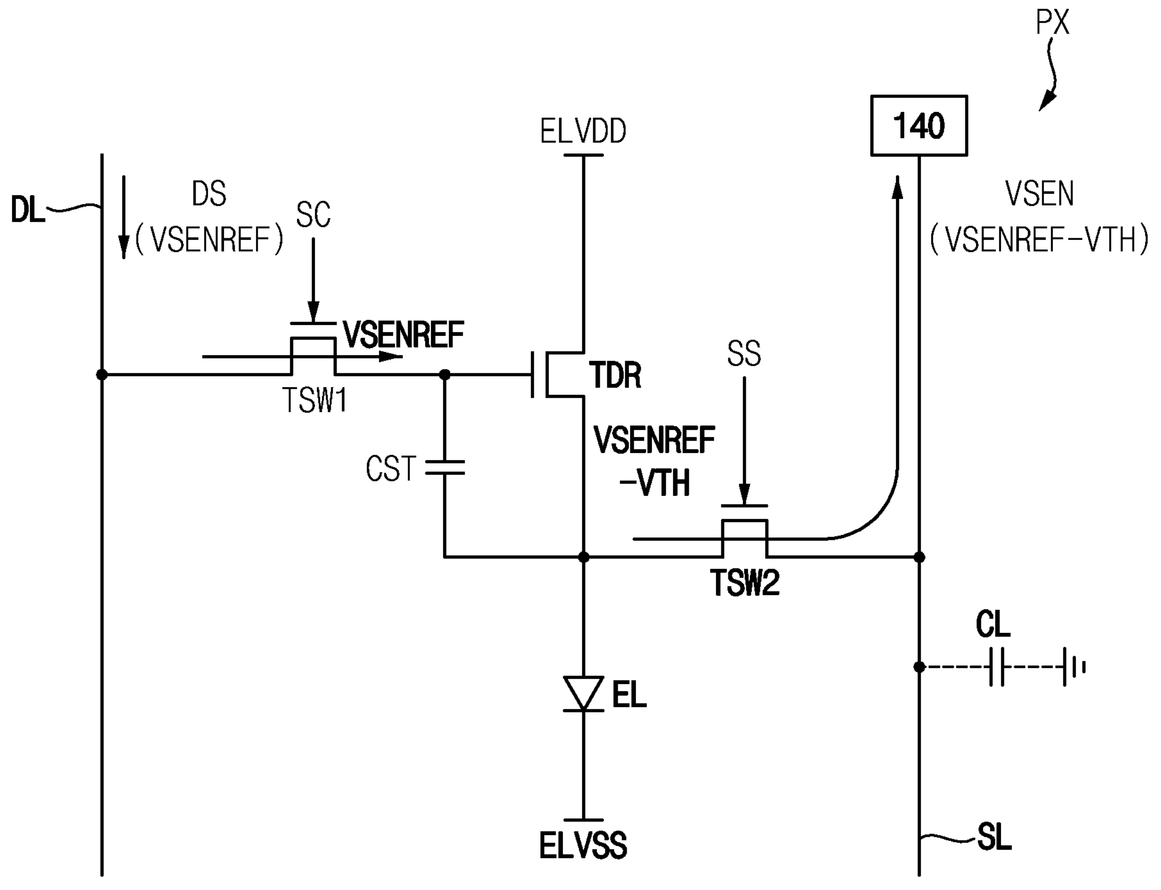
FIG. 2 is a circuit diagram showing a pixel according to an embodiment of the present disclosure.

FIG. 2 is a circuit diagram showing a pixel PX according to an embodiment of the present disclosure. The pixel PX of FIG. 2 may correspond to one of the plurality of pixels PX1 and PX2 included in the display device 100 of FIG. 1.

Referring to FIG. 2, the pixel PX may include a switching transistor TSW1 that transmits a data signal DS (or sensing reference voltage VSENREF) of the data line DL to a storage capacitor CST in response to the scan signal SC, the storage capacitor CST that stores the data signal DS transmitted by the first switching transistor TSW1, a driving transistor TDR that generates a driving current based on the data signal DS stored in the storage capacitor CST, a light emitting element EL that emits light based on the driving current flowing from a first power voltage ELVDD to a second power voltage ELVSS, and a second switching transistor TSW2 that connects a terminal (e.g., source) of the driving transistor TDR to the sensing line SL in response to the sensing signal SS. The sensing line SL may have a line capacitor CL.

In a sensing period, the scan driver 120 may provide the scan signal SC and the sensing signal SS to each pixel PX of a selected pixel row, and the data driver 130 may provide the sensing reference voltage VSENREF to each pixel PX of the selected pixel row. The first switching transistor TSW1 may transmit the sensing reference voltage VSENREF to a gate of the driving transistor TDR in response to the scan signal SC. When the sensing reference voltage VSENREF is applied to the gate of the driving transistor TDR, a voltage of a terminal (e.g., source) of the driving transistor TDR may be saturated with a voltage VSENREF-VTH in which a threshold voltage VTH of the driving transistor TDR is subtracted from the sensing reference voltage VSENREF. The second switching transistor TSW2 may transmit the voltage VSENREF-VTH of the terminal of the driving transistor TDR to the sensing line SL in response to the sensing signal SS, and the sensing driver 140 may sense the voltage VSENREF-VTH as a sensing voltage VSEN of the sensing line SL.

Referring again to FIG. 1, the scan driver 120 may generate the scan signals SC and the sensing signals SS based on a scan control signal SCTRL received from the controller 150, and may sequentially provide the scan signals SC and the sensing signals SS to the plurality of pixels PX1 and PX2 on a row-by-row basis. In an embodiment, the scan control signal SCTRL may include a scan start signal and a scan clock signal, but is not limited thereto. In an embodiment, the scan driver 120 may be integrated or formed on a peripheral portion of the display panel 110. In an embodiment, the scan driver 120 may be implemented with one or more integrated circuits.

The data driver 130 may generate the data signals DS based on output image data ODAT and a data control signal DCTRL received from the controller 150, and may provide the data signals DS to the plurality of pixels PX1 and PX2. In an embodiment, the data driver 130 may provide the sensing reference voltage VSENREF to pixels PX1 and PX2 of a pixel row selected in the sensing period. In an embodiment, the data control signal DCTRL may include a horizontal start signal, an output data enable signal, and a load signal, but is not limited thereto. In an embodiment, the data driver 130 may be implemented with one or more integrated circuits. In an embodiment, the data driver 130 and the controller 150 may be implemented as a single integrated circuit, and the integrated circuit may be referred to as a timing controller embedded data driver (TED).

The sensing driver 140 may sense the characteristics (for example, the threshold voltage VTH and/or mobility of the driving transistor TDR) of the plurality of pixels PX1 and PX2 of the pixel row selected through the plurality of sensing lines SL1 and SL2. The sensing driver 140 may provide sensing data SD generated by sensing the plurality of pixels PX1 and PX2 to the controller 150. In an embodiment, the sensing driver 140 may be implemented as an integrated circuit separate from the integrated circuit of the data driver 130. In an embodiment, the data driver 130 and the sensing driver 140 may be implemented as a single integrated circuit.

The controller 150 (e.g., a timing controller (TCON)) may receive input image data IDAT and a control signal CTRL from an external host processor (e.g., a graphics processing unit (GPU), an application processor (AP), or a graphics card). In an embodiment, the control signal CTRL may include a vertical synchronization signal, a horizontal synchronization signal, an input data enable signal, and a master clock signal, but is not limited thereto. The controller 150 may compensate the input image data IDAT based on the sensing data SD, and may generate the output image data ODAT. The controller 150 may generate the data control signal DCTRL and the scan control signal SCTRL based on the control signal CTRL. The controller 150 may control an operation of the scan driver 120 by providing the scan control signal SCTRL to the scan driver 120, and may control an operation of the data driver 130 by providing the output image data ODAT and the data control signal DCTRL to the data driver 130.

The sensing driver 140 may perform a sensing operation on the sensing lines SL1 and SL2 connected to the pixels PX1 and PX2 of the pixel row selected in each sensing period. In an embodiment, the sensing driver 140 may perform the sensing operation when the display device 100 is powered off. For example, when the display device 100 is powered off, the sensing driver 140 may sequentially perform sensing operations on a plurality of sensing lines connected to a plurality of pixel rows of the display panel 110 in a plurality of sensing periods. In an embodiment, the sensing driver 140 may perform the sensing operation while the display device 100 is driving. For example, while the display device 100 is driven, the sensing driver 140 may perform the sensing operation on the sensing lines connected to at least one pixel row in at least one sensing period within a vertical blank period.

The sensing driver 140 may perform a sensing operation on two or more sensing lines SL1 and SL2 in a time division manner using one sensing channel. For example, each sensing period may include a first sub-sensing period and a second sub-sensing period, and the sensing driver 140 may perform a sensing operation on the first sensing line SL1 using one sensing channel in the first sub-sensing period, and may perform a sensing operation on the second sensing line SL2 using the sensing channel in the second sub-sensing period. Accordingly, the size of the sensing driver 140 may be reduced compared to a sensing driver that includes one sensing channel for each sensing line.

Figure 3:
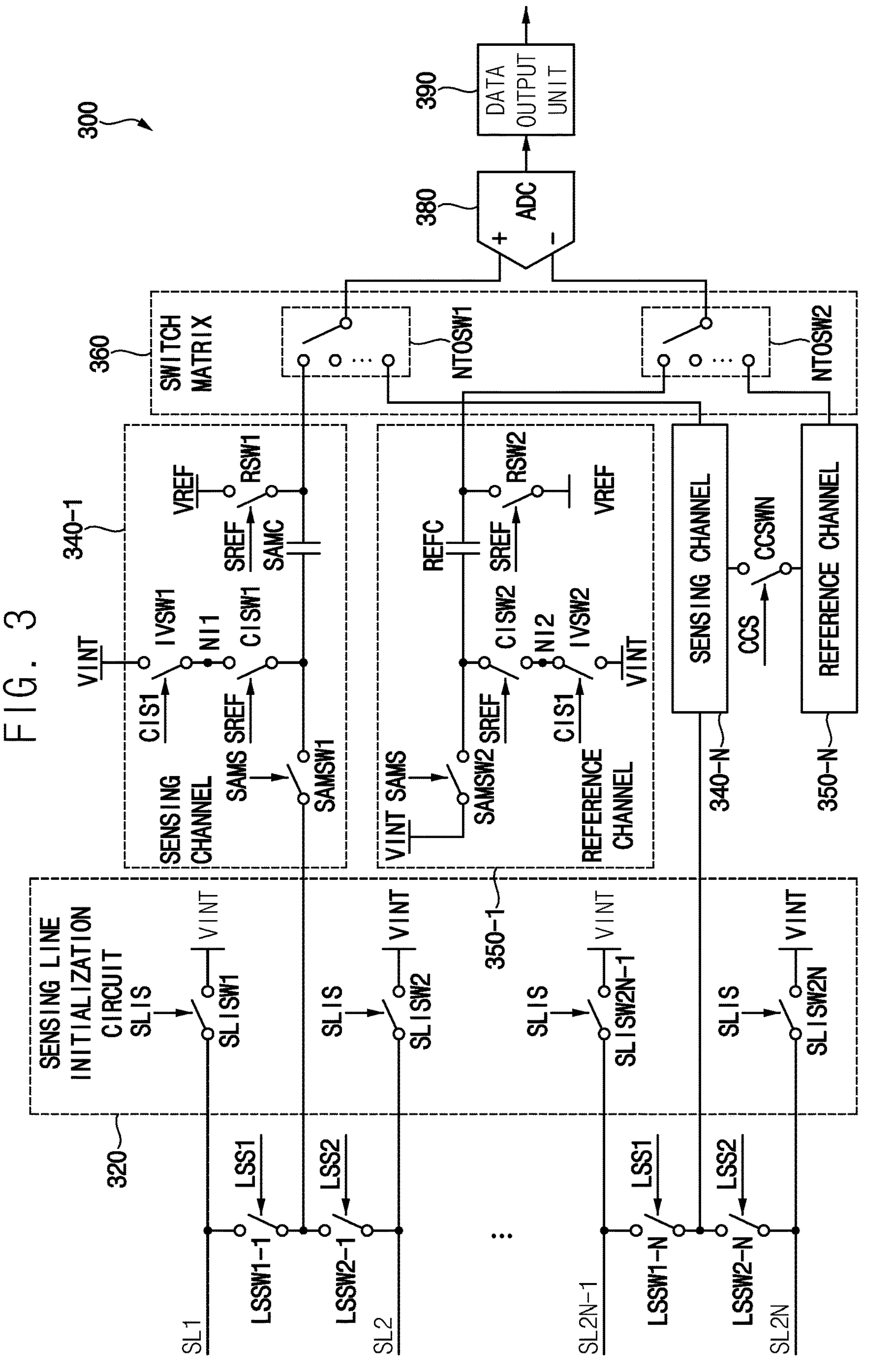
FIG. 3 is a block diagram showing a sensing driver according to an embodiment of the present disclosure.

FIG. 3 is a block diagram showing a sensing driver 300 according to an embodiment of the present disclosure. The sensing driver 300 of FIG. 3 may correspond to the sensing driver 140 included in the display device 100 of FIG. 1.

Referring to FIG. 3, the sensing driver 300 may perform a sensing operation on 2N sensing lines SL1, SL2, . . . , SL2N−1, SL2N, where N is a natural number of 2 or more. The sensing driver 300 may include N first line selection switches LSSW1-1, . . . , LSSW1-N, N second line selection switches LSSW2-1, . . . , LSSW2-N, a sensing line initialization circuit 320, N sensing channels 340-1, . . . , 340-N, N reference channels 350-1, . . . , 350-N, a switch matrix 360, an analog-to-digital converter 380, and a data output unit 390.

The first line selection switches LSSW1-1, . . . , LSSW1-N may respectively connect N odd-numbered sensing lines SL1, . . . , SL2N−1 to the sensing channels 340-1, . . . , 340-N in the first sub-sensing period of the sensing period. For example, in at least a portion of the first sub-sensing period, a first line selection signal LSS1 may have an activation level, and the first line selection switches LSSW1-1, . . . , LSSW1-N may respectively connect the odd-numbered sensing lines SL1, SL2N−1 to the sensing channels 340-1, . . . , 340-N in response to the first line selection signal LSS1 having the activation level.

The second line selection switches LSSW2-1, . . . , LSSW2-N may respectively connect N even-numbered sensing lines SL2, . . . , SL2N to the sensing channels 340-1, . . . , 340-N in the second sub-sensing period of the sensing period. For example, in at least a portion of the second sub-sensing period, a second line selection signal LSS2 may have the activation level, and the second line selection switches LSSW2-1, . . . , LSSW2-N may respectively connect the even-numbered sensing lines SL2, . . . , SL2N to the sensing channels 340-1, . . . , 340-N in response to the second line selection signal LSS2 having the activation level.

The sensing line initialization circuit 320 may initialize the sensing lines SL1, SL2, . . . . SL2N−1, SL2N. In an embodiment, the sensing line initialization circuit 320 may include 2N sensing line initialization switches SLISW1, SLISW2, , , , , SLISW2N−1, SLISW2N to initialize the sensing lines SL1, SL2, . . . , SL2N−1, SL2N−1. For example, the first sensing line initialization switch SLISW1 may apply an initialization voltage VINT to the first sensing line SL1 in response to the sensing line initialization signal SLIS, the second sensing line initialization switch SLISW2 may apply the initialization voltage VINT to the second sensing line SL2 in response to the sensing line initialization signal SLIS, the $2N-1^{th}$ sensing line initialization switch SLISW2N−1 may apply the initialization voltage VINT to the 2N−1th sensing line SL2N−1 in response to the sensing line initialization signal SLIS, and the $2N^{th}$ sensing line initialization switch SLISW2N may apply the initialization voltage VINT to the $2N^{th}$ sensing line SL2N in response to the sensing line initialization signal SLIS. Accordingly, the sensing lines SL1, SL2, . . . , SL2N−1, SL2N may be initialized based on the initialization voltage VINT.

The sensing channels 340-1, . . . , 340-N may sample N first sensing voltages of the odd-numbered sensing lines SL1, . . . , SL2N−1 in a first sampling period of the first sub-sensing period, and may sample N second sensing voltages of the even-numbered sensing lines SL2, . . . , SL2N in a second sampling period of the second sub-sensing period. In an embodiment, each of the sensing channels 340-1, . . . , 340-N may include a sampling capacitor SAMC, a first sampling switch SAMSW1, a first reference switch RSW1, a first initialization voltage switch IVSW1, and a first capacitor initialization switch CISW1. For example, the sampling capacitor SAMC may have a first electrode and a second electrode. The first sampling switch SAMSW1 may connect the corresponding first and second line selection switches LSSW1-1 and LSSW2-1 to the first electrode of the sampling capacitor SAMC in response to a sampling signal SAMS. The first reference switch RSW1 may apply a reference voltage VREF to the second electrode of the sampling capacitor SAMC in response to a reference signal SREF. The first initialization voltage switch IVSW1 may apply the initialization voltage VINT to a first intermediate node NI1 in response to a first capacitor initialization signal CIS1. The first capacitor initialization switch CISW1 may connect the first intermediate node NI1 to the first electrode of the sampling capacitor SAMC in response to the reference signal SREF.

A voltage having a first initialization level may be applied to the first electrode of the sampling capacitor SAMC in a first capacitor initialization period of the first sub-sensing period, and a voltage having a second initialization level different from the first initialization level may be applied to the first electrode of the sampling capacitor SAMC in a second capacitor initialization period of the second sub-sensing period. In an embodiment, the second initialization level may be higher than the first initialization level.

Figure 5:
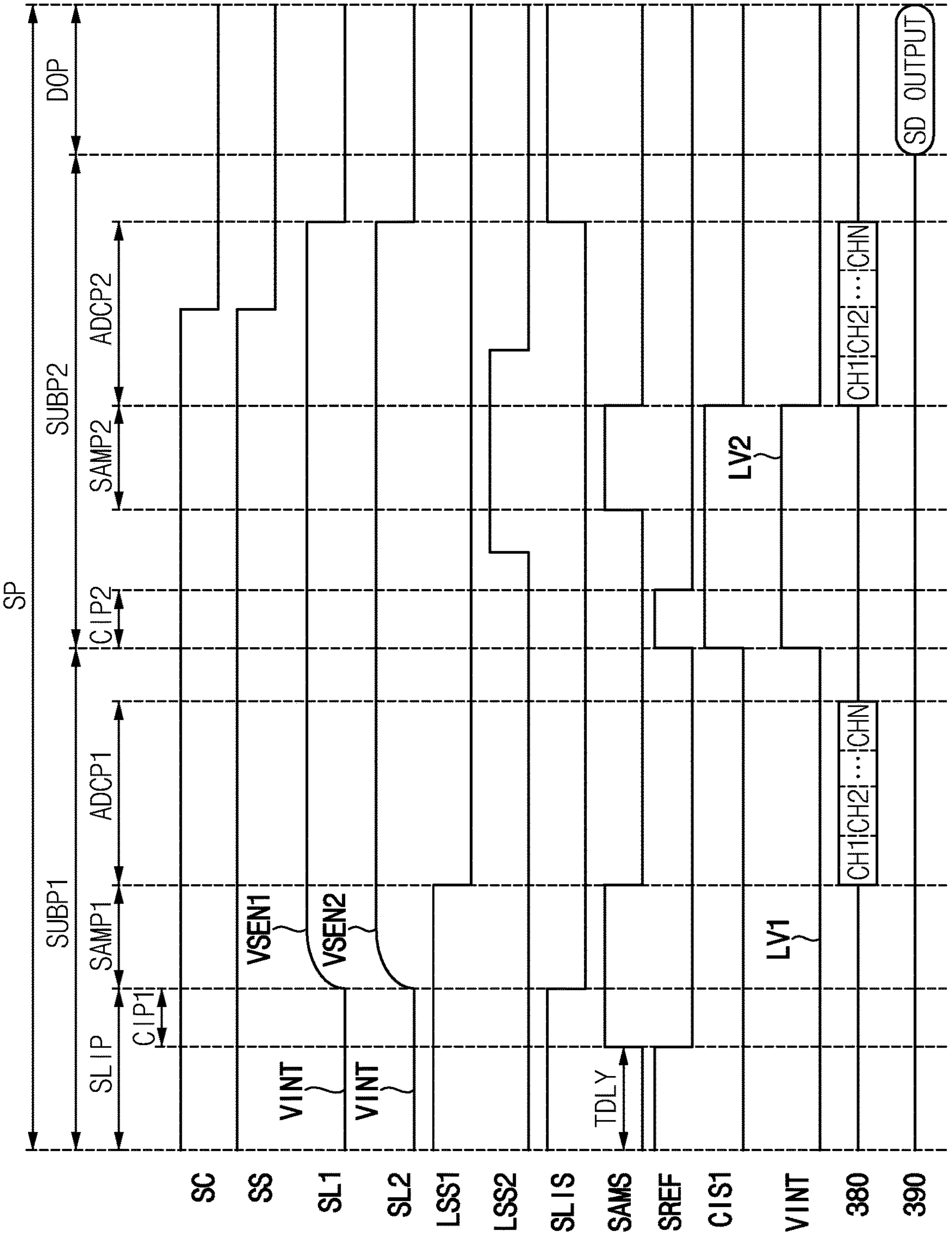
FIG. 5 is a timing diagram for describing an operation of a sensing driver according to an embodiment of the present disclosure.

In an embodiment, the initialization voltage VINT having a first voltage level LV1 of FIG. 5 may be applied to the first electrode of the sampling capacitor SAMC in the first capacitor initialization period of the first sub-sensing period, and the initialization voltage VINT having a second voltage level LV2 of FIG. 5 may be applied to the first electrode of the sampling capacitor SAMC in the second capacitor initialization period of the second sub-sensing period. In an embodiment, the initialization voltage VINT may have the first voltage level LV1 in the first sub-sensing period, and may have the second voltage level LV2 different from the first voltage level LV1 in the second capacitor initialization period and the second sampling period of the second sub-sensing period.

The reference channels 350-1, . . . , 350-N may store a voltage (e.g., initialization voltage VINT) that serves as reference for the first sensing voltages or the second sensing voltages sampled by the sensing channels 340-1, . . . , 340-N such that the analog-to-digital converter 380 performs an analog-to-digital conversion operation on voltage differences between voltages output from the sensing channels 340-1, . . . , 340-N and voltages output from the reference channels 350-1, . . . , 350-N. In an embodiment, each of the reference channels 350-1, . . . , 350-N may include a reference capacitor REFC, a second sampling switch SAMSW2, a second reference switch RSW2, a second initialization voltage switch IVSW2, and a second capacitor initialization switch CISW2. For example, the reference capacitor REFC may have a first electrode and a second electrode. The second sampling switch SAMSW2 may apply the initialization voltage VINT to the first electrode of the reference capacitor REFC in response to the sampling signal SAMS. The second reference switch RSW2 may apply the reference voltage VREF to the second electrode of the reference capacitor REFC in response to the reference signal SREF. The second initialization voltage switch IVSW2 may apply the initialization voltage VINT to a second intermediate node NI2 in response to the first capacitor initialization signal CIS1. The second capacitor initialization switch CISW2 may connect the second intermediate node NI2 to the first electrode of the reference capacitor REFC in response to the reference signal SREF.

The switch matrix 360 and the analog-to-digital converter 380 may sequentially convert the first sensing voltages of the odd-numbered sensing lines SL1, . . . , SL2N−1 sampled by the sensing channels 340-1, . . . , 340-N into N first sensing data, and may sequentially convert the second sensing voltages of the even-numbered sensing lines SL2, . . . , SL2N sampled by the sensing channels 340-1, . . . 340-N into N second sensing data. For example, in a first analog-to-digital conversion period of the first sub-sensing period, the switch matrix 360 may sequentially connects the sensing channels 340-1, . . . , 340-N to the analog-to-digital converter 380, the switch matrix 360 may sequentially connect the reference channels 350-1, . . . , 350-N to the analog-to-digital converter 380, and the analog-to-digital converter 380 may sequentially convert the first sensing voltages of the odd-numbered sensing lines SL1, . . . , SL2N−1 into the first sensing data. Further, in a second analog-to-digital conversion period of the second sub-sensing period, the switch matrix 360 may sequentially connect the sensing channels 340-1, . . . , 340-N to the analog-to-digital converter 380, the switch matrix 360 may sequentially connect the reference channels 350-1, . . . , 350-N to the analog-to-digital converter 380, and the analog-to-digital converter 380 may sequentially convert the second sensing voltages of the even-numbered sensing lines SL2, SL2N into the second sensing data. In an embodiment, the switch matrix 360 may include a first N-to-1 switch NTOSW1 that connects one of the sensing channels 340-1, . . . , 340-N to a first input terminal (e.g., positive input terminal) of the analog-to-digital converter 380, and a second N-to-1 switch NTOSW2 that connects one of the reference channels 350-1, . . . , 350-N to a second input terminal (e.g., negative input terminal) of the analog-to-digital converter 380.

The data output unit 390 may sequentially store the first sensing data in the first analog-to-digital conversion period, may sequentially store the second sensing data in the second analog-to-digital conversion period, and may output the first sensing data and the second sensing data in an output period of the sensing period. In an embodiment, the data output unit 390 may rearrange the first sensing data and the second sensing data such that each second sensing data is disposed between adjacent two of the first sensing data. For example, the data output unit 390 may rearrange the first sensing data and the second sensing data such that 2N sensing data for the sensing lines SL1, SL2, . . . , SL2N−1, SL2N are sequentially output.

Figure 4:
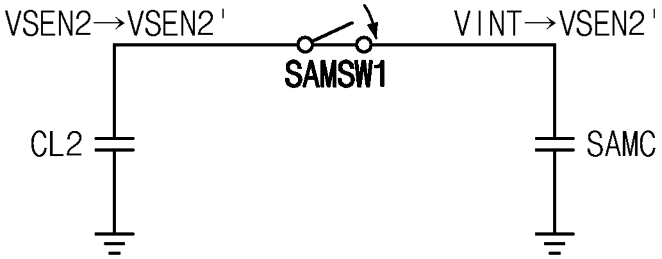
FIG. 4 is a diagram for describing charge sharing between a second line capacitor and a sampling capacitor.

FIG. 4 is a diagram for describing charge sharing between a second line capacitor CL2 and the sampling capacitor SAMC.

Referring to FIG. 4, between the second capacitor initialization period and the second sampling period of the second sub-sensing period, the second sensing voltage VSEN2 may be stored in the second line capacitor CL2 of the second sensing line SL2, and the initialization voltage VINT may be applied to the first electrode of the sampling capacitor SAMC. The sum QT of the amount of charge accumulated in the second line capacitor CL2 and the amount of charge accumulated in the sampling capacitor SAMC before the second sampling period may be calculated by Equation 1.

$$QT = CL2 \times VSEN2 + SAMC \times VINT \quad \text{[Equation 1]}$$

The first sampling switch SAMSW1 may be turned on in the second sampling period, and the sum of the amount of charge accumulated in the second line capacitor CL2 and the amount of charge accumulated in the sampling capacitor SAMC in the second sampling period may be equal to the sum QT of the amount of charge accumulated in the second line capacitor CL2 and the amount of charge accumulated in the sampling capacitor SAMC before the second sampling period of the sub-sensing period. A voltage VSEN2' of the first electrode of the sampling capacitor SAMC due to charge sharing between the second line capacitor CL2 and the sampling capacitor SAMC in the second sampling period may be calculated by Equation 2.

$$VSEN2' = \frac{QT}{CL2 + SAMC} = \frac{CL2}{CL2 + SAMC} \times VSEN2 + \frac{SAMC}{CL2 + SAMC} \times VINT \quad \text{[Equation 2]}$$

When the initialization voltage VINT is different from the second sensing voltage VSEN2, the voltage VSEN2' of the first electrode of the sampling capacitor SAMC may be different from the second sensing voltage VSEN2, and a voltage sampled by the sensing channel in the second sampling period may be different from the second sensing voltage VSEN2. For example, when a voltage level of the initialization voltage VINT is lower than a voltage level of the second sensing voltage VSEN2, a voltage level of the voltage VSEN2' of the first electrode of the sampling capacitor SAMC may be lower than the voltage level of the second sensing voltage VSEN2, and a voltage level of the voltage sampled by the sensing channel in the second sampling period may be lower than the voltage level of the second sensing voltage VSEN2. Accordingly, although the first sensing voltage is equal to the second sensing voltage VSEN2, an offset between the first sensing data and the second sensing data, which corresponds to a difference between the second sensing voltage VSEN2 and the voltage VSEN2' of the first electrode of the sampling capacitor SAMC, may occur. In a comparative example of the present disclosure, the voltage level of the initialization voltage VINT may be equal in the first sub-sensing period and the second sub-sensing period, and the offset between the first sensing data and the second sensing data may occur due to a difference between the initialization voltage VINT and the second sensing voltage VSEN2 although the first sensing voltage is equal to the second sensing voltage VSEN2. However, as described above, in an embodiment of the present disclosure, the initialization voltage VINT may have the first voltage level in the first sub-sensing period, and may have the second voltage level different from the first voltage level (e.g., higher than the first voltage level) in at least a portion of the second sub-sensing period. Accordingly, the difference between the initialization voltage VINT and the second sensing voltage VSEN2 may not substantially exist or decrease, and the offset between the first sensing data and the second sensing data may be reduced.

Figure 6:
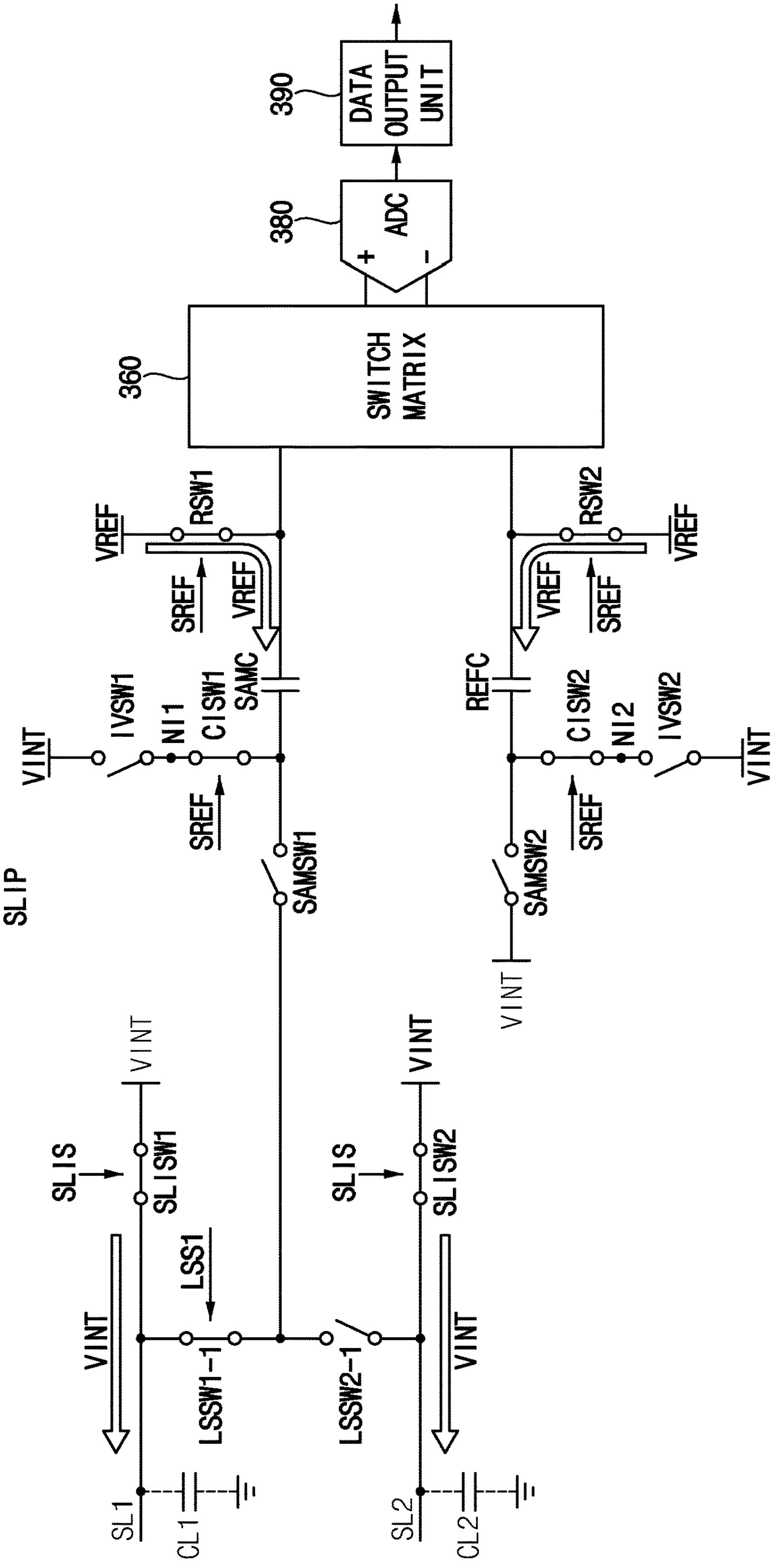
FIG. 6 is a diagram for describing an operation of the sensing driver in a sensing line initialization period.
Figure 7:
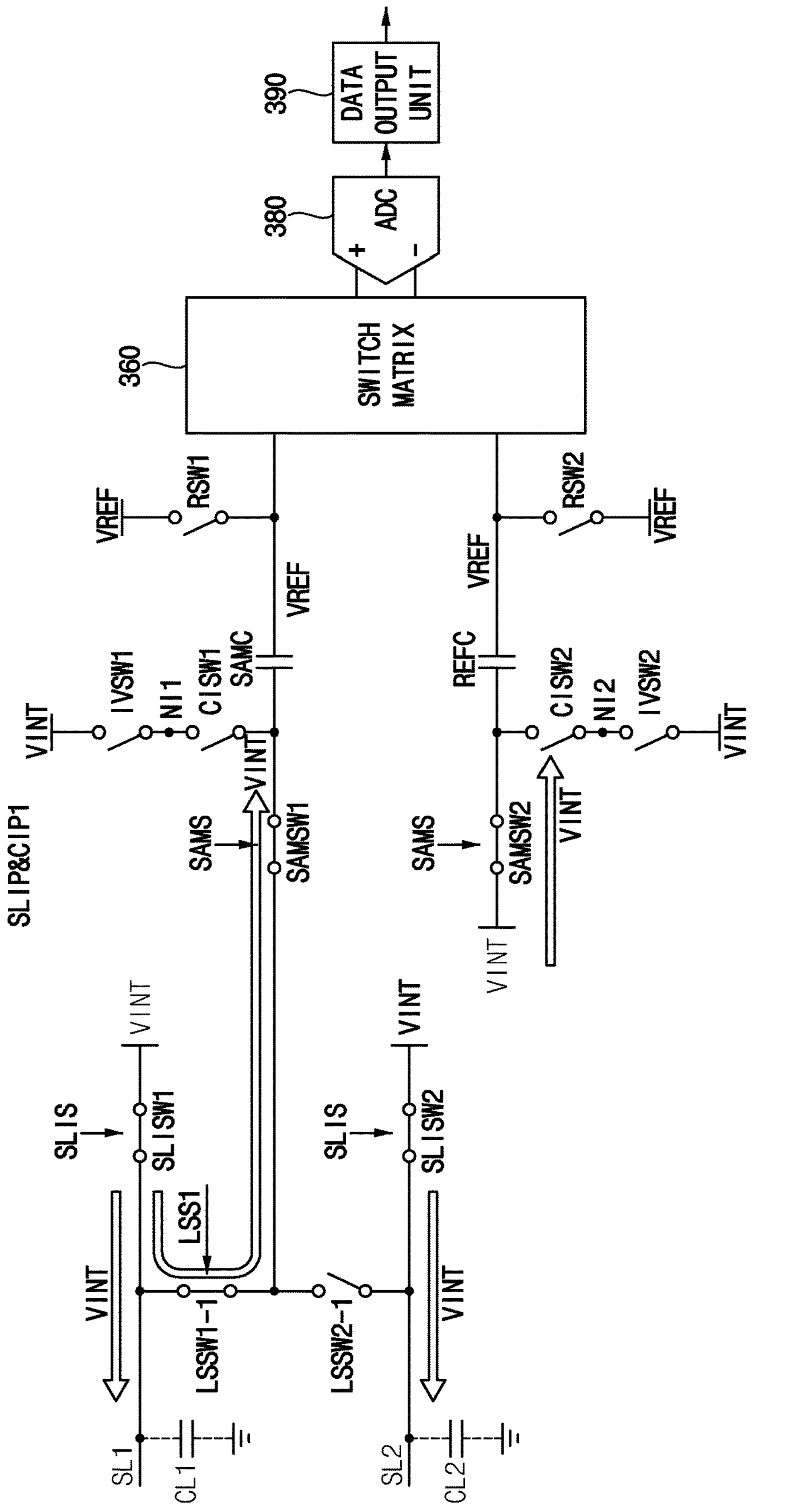
FIG. 7 is a diagram for describing an operation of the sensing driver in a first capacitor initialization period.
Figure 8:
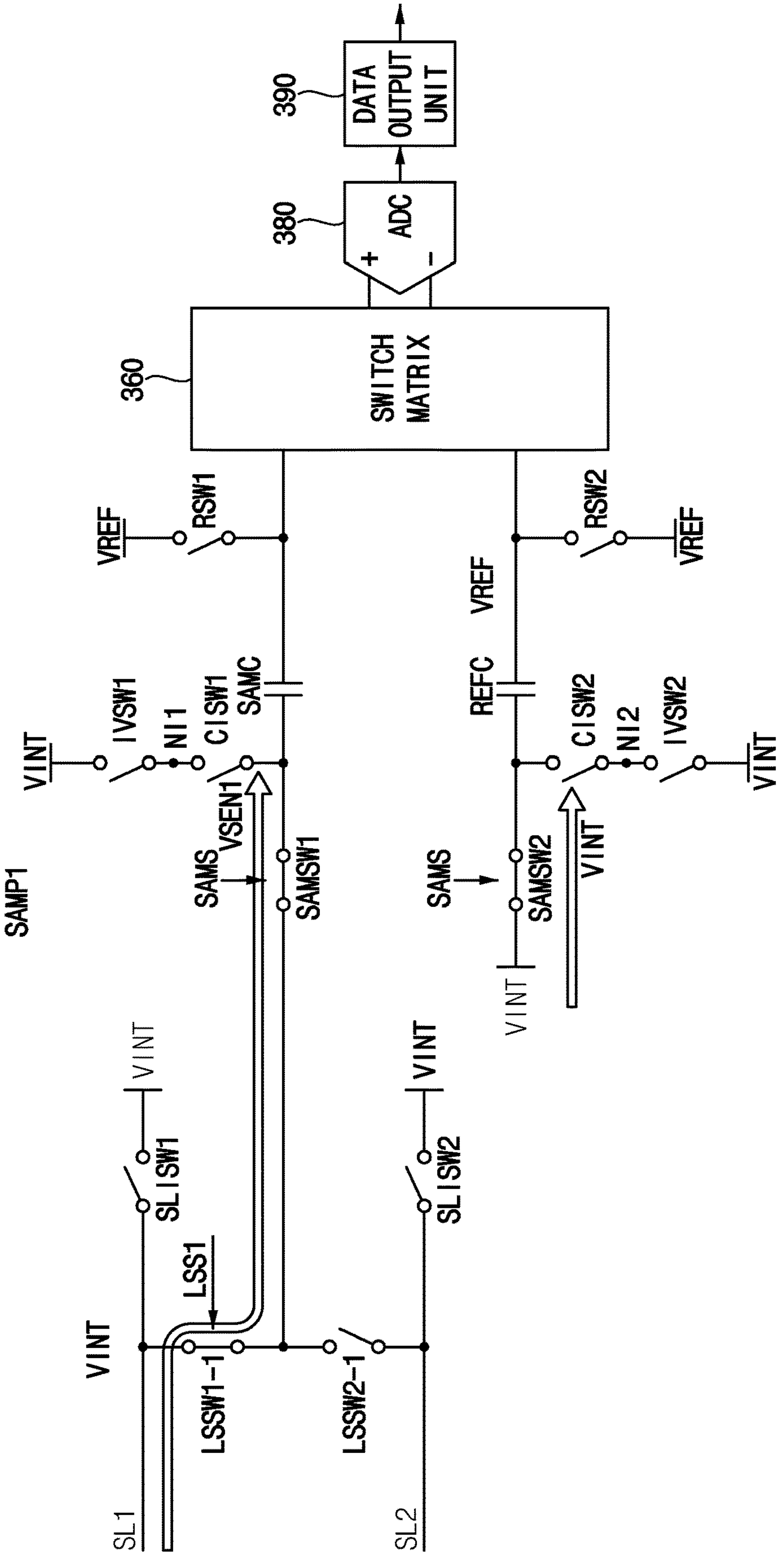
FIG. 8 is a diagram for describing an operation of the sensing driver in a first sampling period.
Figure 9:
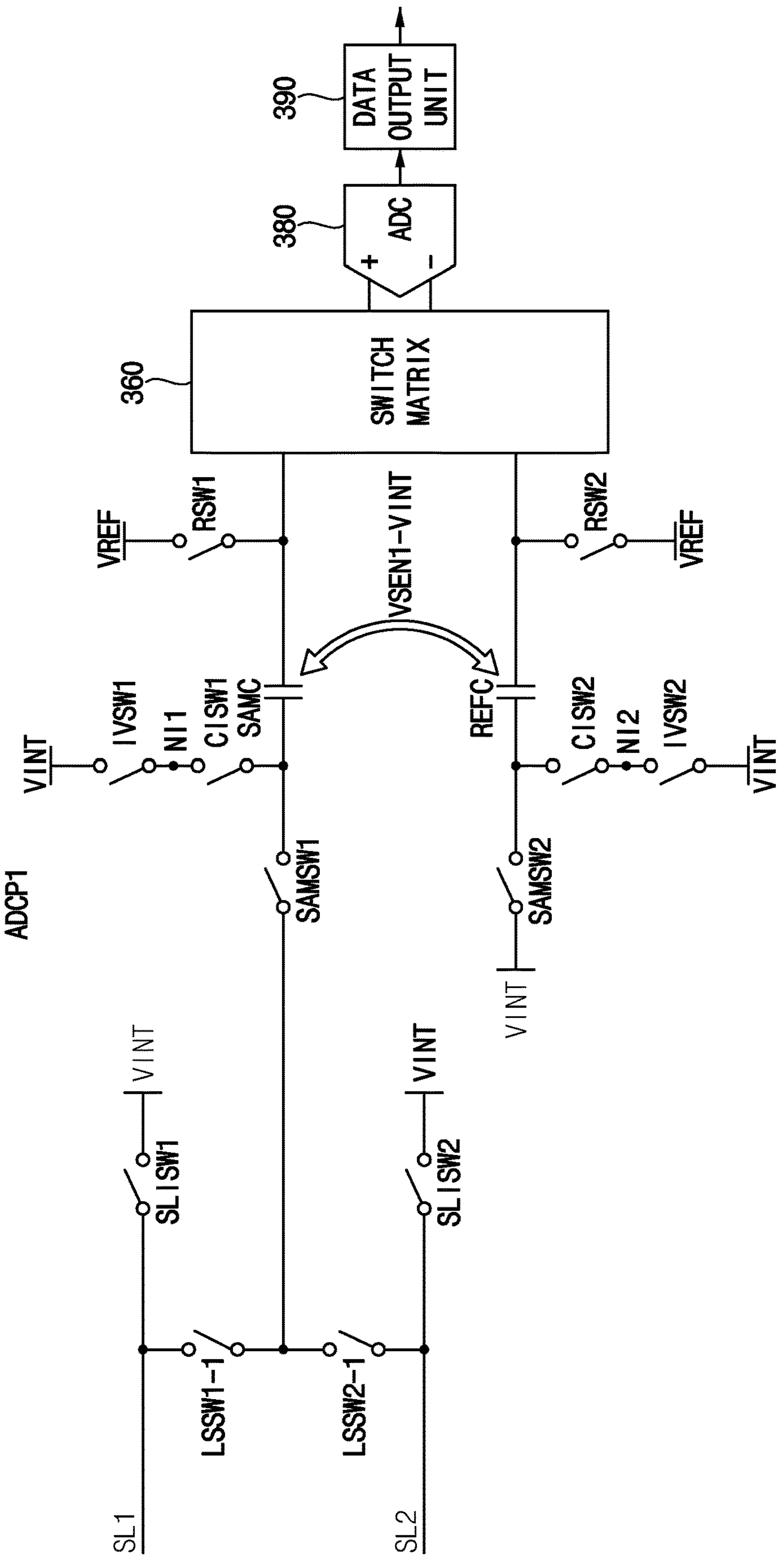
FIG. 9 is a diagram for describing an operation of the sensing driver in a first analog-to-digital conversion period.
Figure 10:
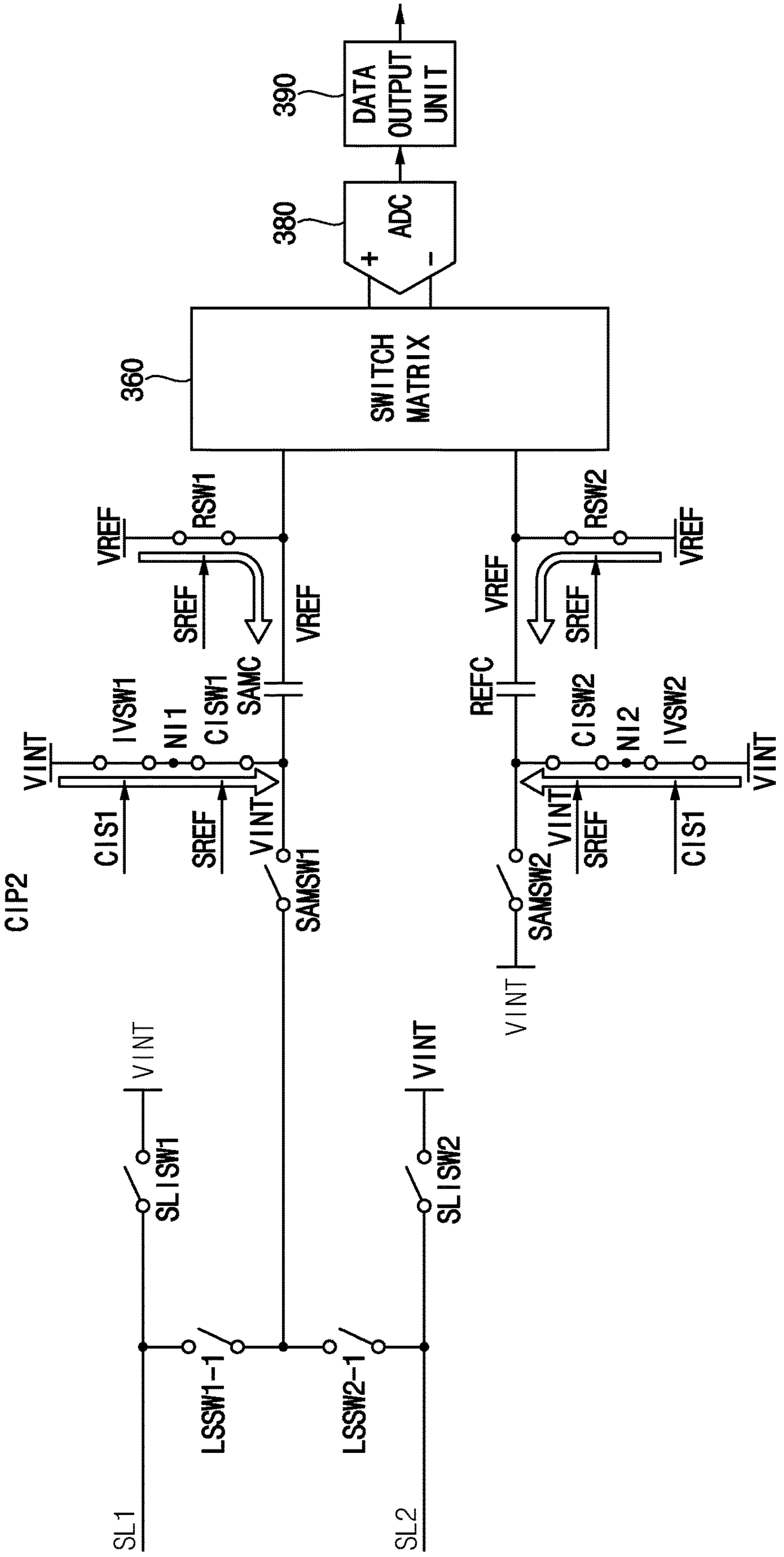
FIG. 10 is a diagram for describing an operation of the sensing driver in a second capacitor initialization period.
Figure 11:
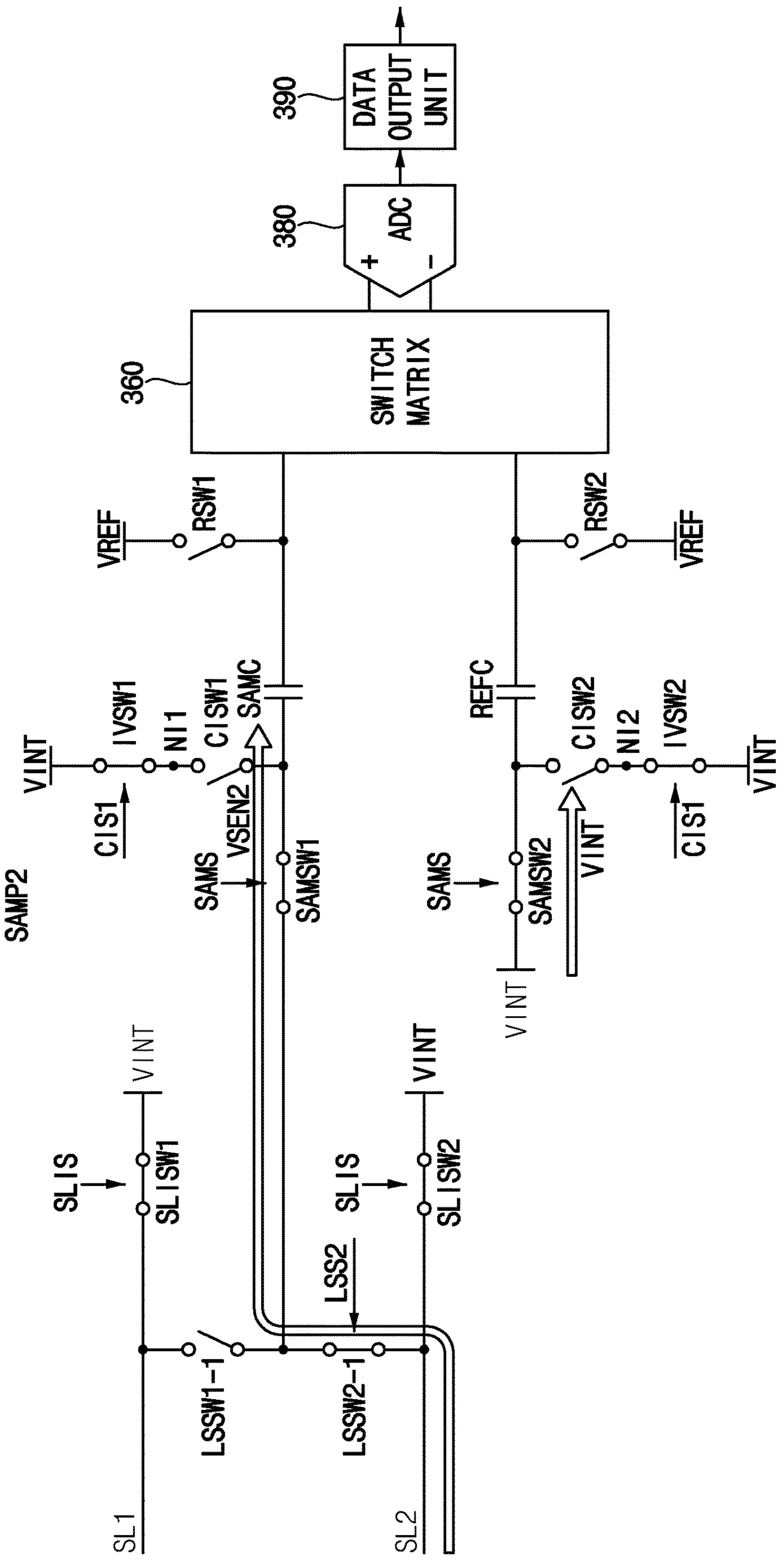
FIG. 11 is a diagram for describing an operation of the sensing driver in a second sampling period.
Figure 12:
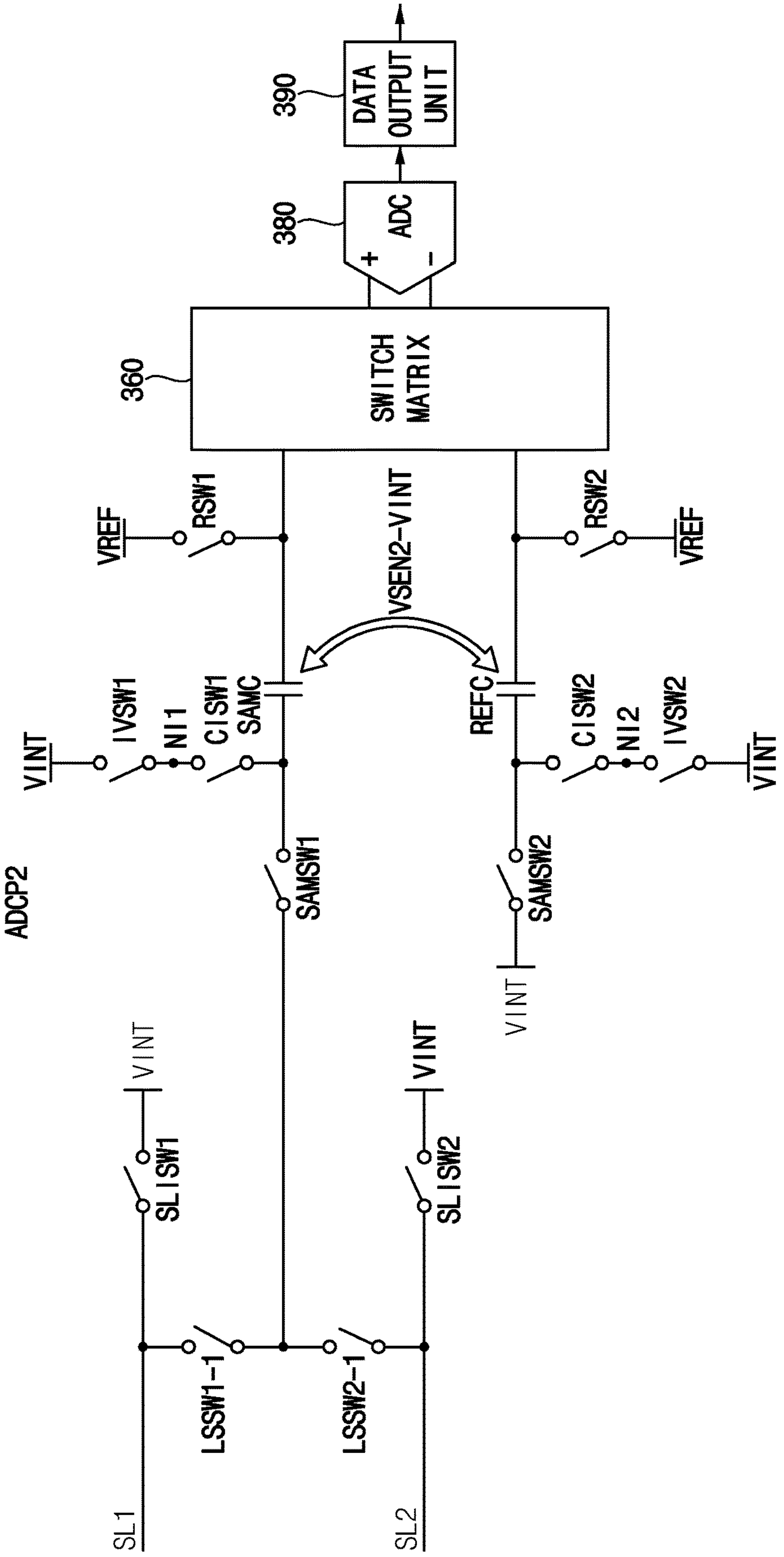
FIG. 12 is a diagram for describing an operation of the sensing driver in a second analog-to-digital conversion period.
Figure 13:
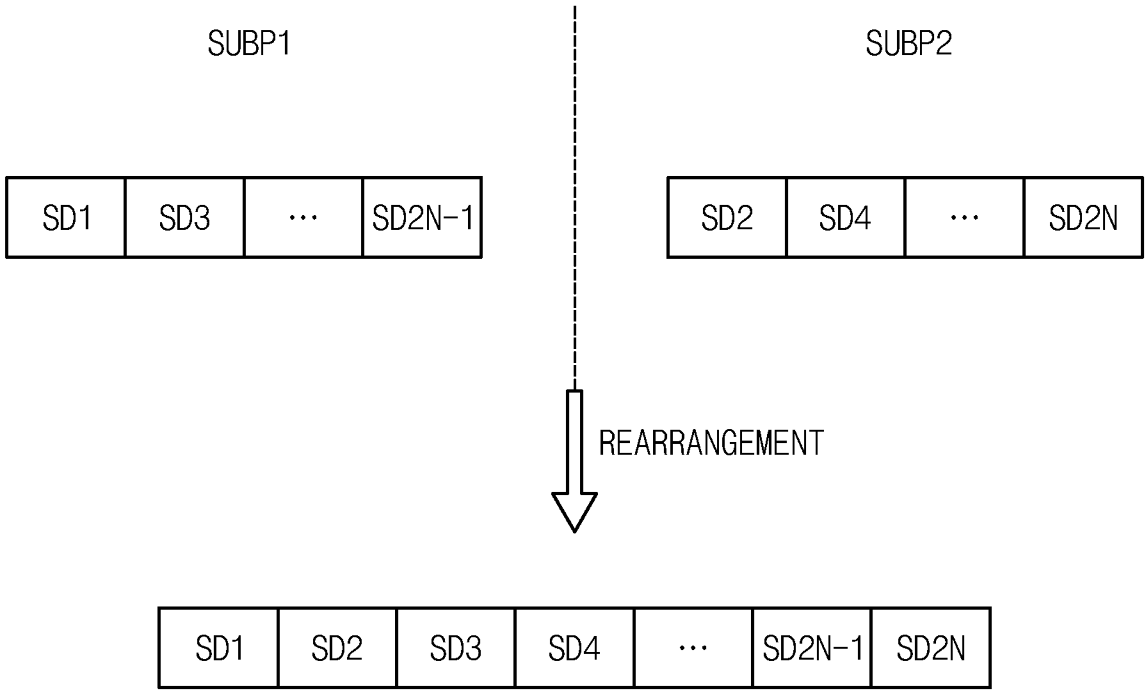
FIG. 13 is a diagram for describing rearrangement of first sensing data and second sensing data.

FIG. 5 is a timing diagram for describing an operation of a sensing driver 300 according to an embodiment of the present disclosure. FIG. 6 is a diagram for describing an operation of the sensing driver 300 in a sensing line initialization period SLIP. FIG. 7 is a diagram for describing an operation of the sensing driver 300 in the first capacitor initialization period CIP1. FIG. 8 is a diagram for describing an operation of the sensing driver 300 in the first sampling period SAMP1. FIG. 9 is a diagram for describing an operation of the sensing driver 300 in the first analog-to-digital conversion period ADCP1. FIG. 10 is a diagram for describing an operation of the sensing driver 300 in the second capacitor initialization period CIP2. FIG. 11 is a diagram for describing an operation of the sensing driver 300 in the second sampling period SAMP2. FIG. 12 is a diagram for describing an operation of the sensing driver 300 in the second analog-to-digital conversion period ADCP2. FIG. 13 is a diagram for describing rearrangement of first sensing data and second sensing data.

Referring to FIGS. 3 and 5 to 13, the sensing period SP may include a first sub-sensing period SUBP1 in which first sensing operations on the odd-numbered sensing lines SL1, . . . , SL2N−1 are performed, a second sub-sensing period SUBP2 in which second sensing operations on the even-numbered sensing lines SL2, . . . , SL2N are performed, and a data output period DOP in which the sensing data SD is output. Hereinafter, for convenience of description, the first sensing operation on the first sensing line SL1 among the odd-numbered sensing lines SL1, . . . , SL2N−1 and the second sensing operation on the second sensing line SL2 among the even-numbered sensing lines SL2, . . . , SL2N will be described. The first sensing operations on other sensing lines among the odd-numbered sensing lines SL1, . . . , SL2N−1 may be substantially the same as the first sensing operation on the first sensing line SL1, and the second sensing operations on other sensing lines among the even-numbered sensing lines SL2, . . . , SL2N may be substantially the same as the second sensing operation on the second sensing line SL1.

The first sub-sensing period SUBP1 may include a sensing line initialization period SLIP, the first capacitor initialization period CIP1, the first sampling period SAMP1, and the first analog-to-digital conversion period ADCP1. In an embodiment, the first capacitor initialization period CIP1 may overlap the sensing line initialization period SLIP. In an embodiment, the initialization voltage VINT may have the first voltage level LV1 in the first sub-sensing period SUBP1.

In the sensing line initialization period SLIP, the sensing line initialization circuit 320 may substantially simultaneously initialize the first sensing line SL1 and the second sensing line SL2. For example, as shown in FIGS. 5 and 6, in the sensing line initialization period SLIP, the sensing line initialization signal SLIS may have an activation level, and the first sensing line initialization switch SLISW1 may apply the initialization voltage VINT to the first sensing line SL1 in response to the sensing line initialization signal SLIS having the activation level, the second sensing line initialization switch SLISW2 may apply the initialization voltage VINT to the second sensing line SL2 in response to the sensing line initialization signal SLIS having the activation level, and the first sensing line SL1 and the second sensing line SL2 may be initialized based on the initialization voltage VINT.

In the sensing line initialization period SLIP, the first reference switch RSW1 and the second reference switch RSW2 may be turned on in response to the reference signal SREF having an activation level, the reference voltage VREF may be applied to the second electrode of the sampling capacitor SAMC through the first reference switch RSW1, and the reference voltage VREF may be applied to the second electrode of the reference capacitor REFC through the second reference switch RSW2.

In the first capacitor initialization period CIP1, the sampling capacitor SAMC and the reference capacitor REFC may be initialized. In an embodiment, the first capacitor initialization period CIP1 may overlap a portion of the sensing line initialization period SLIP (for example, an end portion of the sensing line initialization period SLIP). For example, as shown in FIGS. 5 and 7, in the first capacitor initialization period CIP1, the sampling signal SAMS, the sensing line initialization signal SLIS, and the first line selection signal LSS1 may have an activation level. The first sampling switch SAMSW1 and the second sampling switch SAMSW2 may be turned on in response to the sampling signal SAMS having the activation level, the first sensing line initialization switch SLISW1 may be turned on in response to the initialization signal SLIS having the activation level, and the first line selection switch LSSW1-1 may be turned on in response to the first line selection signal LSS1 having the activation level. Accordingly, the initialization voltage VINT having the first voltage level VL1 may be applied to the first electrode of the sampling capacitor through the first sensing line initialization switch SLISW1, the first line selection switch LSSW1-1, and the first sampling switch SAMSW1, and may be applied to the first electrode of the reference capacitor REFC through the second sampling switch SAMSW2. Accordingly, the sampling capacitor SAMC and the reference capacitor REFC may be initialized or discharged based on the initialization voltage VINT having the first voltage level VL1 and the reference voltage VREF.

In an embodiment, the sampling signal SAMS may have the activation level after a delay time TDLY from a start of the first sub-sensing period SUBP1. As the activation point of the sampling signal SAMS is delayed by the delay time TDLY, the first sensing operation may be more stably performed.

In the first sampling period SAMP1, a voltage of the first sensing line SL1 may be saturated with the first sensing voltage VSEN1, a voltage of the second sensing line SL2 may be saturated with the second sensing voltage VSEN2, and the sensing channel 340-1 may sample the first sensing voltage VSEN1 of the first sensing line SL1. For example, as shown in FIGS. 5 and 8, in the first sampling period SAMP1, the first line selection signal LSS1 and the sampling signal SAMS may have an activation level, and the second line selection signal LSS2 may have a deactivation level. The first line selection switch LSSW1-1 may be turned on in response to the first line selection signal LSS1 having the activation level, and the first sampling switch SAMSW1 and the second sampling switch SAMSW2 may be turned on in response to the sampling signal SAMS having the activation level. Accordingly, the first sensing voltage VSEN1 of the first sensing line SL1 may be applied to the first electrode of the sampling capacitor SAMC through the first line selection switch LSSW1-1 and the first sampling switch SAMSW1, and the initialization voltage VINT may be applied to the first electrode of the reference capacitor REFC through the second sampling switch SAMSW2.

In the first analog-to-digital conversion period ADCP1, the switch matrix 360 and the analog-to-digital converter 380 may sequentially convert the first sensing voltages VSEN1 of the odd-numbered sensing lines SL1, . . . , SL2N−1 sampled by the sensing channels 340-1, . . . , 340-N, or CH1, CH2, . . . , CHN into the first sensing data. The second electrode of the sampling capacitor SAMC and the second electrode of the reference capacitor REFC may have a first voltage difference VSEN1-VINT in which the initialization voltage VINT is subtracted from the first sensing voltage VSEN1. The switch matrix 360 may respectively connect the second electrode of the sampling capacitor SAMC and the second electrode of the reference capacitor REFC to the first input terminal and the second input terminal of the analog-to-digital converter 380, and the analog-to-digital converter 380 may convert the first voltage difference VSEN1−VINT into the first sensing data. Analog-to-digital conversion operations by the switch matrix 360 and the analog-to-digital converter 380 may be sequentially performed from the first sensing channel 340-1 or CH1 to the $N^{th}$ sensing channel 340-N or CHN.

The data output unit 390 may sequentially store the first sensing data generated by the analog-to-digital converter 380 in the first analog-to-digital conversion period ADCP1.

The second sub-sensing period SUBP2 may include the second capacitor initialization period CIP2, the second sampling period SAMP2, and the second analog-to-digital conversion period ADCP2. In an embodiment, the initialization voltage VINT may have the second voltage level LV2 different from the first voltage level LV1 in the second capacitor initialization period CIP2 and the second sampling period SAMP2 of the second sub-sensing period SUBP2. For example, as shown in FIG. 5, the second voltage level LV2 of the initialization voltage VINT may be higher than the first voltage level LV1 of the initialization voltage VINT.

In an embodiment, the second initialization level (e.g., the second voltage level LV2 of the initialization voltage VINT) may be set before the sensing period SP. For example, the second initialization level may be set to a pre-calculated value to reduce the offset between first sensing data and the second sensing data.

In an embodiment, the second initialization level may be set based on the first sensing voltages VSEN1 of the odd-numbered sensing lines SL1, . . . , SL2N−1 and the second sensing voltages VSEN2 of the even-numbered sensing lines SL2, . . . , SL2N. For example, the second initialization level may be set to an average of the first sensing voltage VSEN1 and the second sensing voltage VSEN2. Accordingly, the sensing voltages of the sensing lines SL1, SL2, . . . , SL2N−1, SL2N saturated in the first sampling period SAMP1 of the first sub-sensing period SUBP1 may be used to calculate the second initialization level in the second sub-sensing period SUBP2.

In an embodiment, the second initialization level may be set based on sensing voltages of some sensing lines (for example, sensing lines in a specific area) among the sensing lines SL1, SL2, . . . , SL2N−1, SL2N. Since calculating the second initialization level based on the sensing voltages of all the sensing lines SL1, SL2, . . . , SL2N−1, SL2N takes a long time, the second initialization level may be set based on sensing voltages of some sensing lines among the sensing lines SL1, SL2, . . . , SL2N−1, SL2N.

In the second capacitor initialization period CIP2, the sampling capacitor SAMC and the reference capacitor REFC may be initialized. For example, as shown in FIGS.

5 and 10, in the second capacitor initialization period CIP2, the first capacitor initialization signal CIS1 and the reference signal SREF may have an activation level. The first initialization voltage switch IVSW1 and the second initialization voltage switch IVSW2 may be turned on in response to the first capacitor initialization signal CIS1 having the activation level, and the first capacitor initialization switch CISW1 and the second capacitor initialization switch CISW2 may be turned on in response to the reference signal SREF having the activation level. Accordingly, the initialization voltage VINT having the second voltage level VL2 may be applied to the first electrode of the sampling capacitor SAMC through the first initialization voltage switch IVSW1 and the first capacitor initialization switch CISW1, and may be applied to the first electrode of the reference capacitor REFC through the second initialization voltage switch IVSW2 and the second capacitor initialization switch CISW2. Further, the first reference switch RSW1 and the second reference switch RSW2 may be turned on in response to the reference signal SREF having the activation level, the reference voltage VREF may be applied to the second electrode of the sampling capacitor SAMC through the first reference switch RSW1, and the reference voltage VREF may be applied to the second electrode of the reference capacitor REFC through the second reference switch RSW2. Accordingly, the sampling capacitor SAMC and the reference capacitor REFC may be initialized or discharged based on the initialization voltage VINT having the second voltage level VL2 and the reference voltage VREF.

In the second sampling period SAMP2, the sensing channel 340-1 may sample the second sensing voltage VSEN2 of the second sensing line SL2. The second sensing line SL2 may maintain the second sensing voltage VSEN2 saturated in the first sampling period SAMP1 until the second sampling period SAMP2. For example, as shown in FIGS. 5 and 11, in the second sampling period SAMP2, the second line selection signal LSS2 and the sampling signal SAMS may have an activation level, and the first line selection signal LSS1 may have a deactivation level. The second line selection switch LSSW2-1 may be turned on in response to the second line selection signal LSS2 having the activation level, and the first sampling switch SAMSW1 and the second sampling switch SAMSW2 may be turned on in response to the sampling signal SAMS having the activation level. Accordingly, the second sensing voltage VSEN2 of the second sensing line SL2 may be applied to the first electrode of the sampling capacitor SAMC through the second line selection switch LSSW2-1 and the first sampling switch SAMSW1, and the initialization voltage VINT may be applied to the first electrode of the reference capacitor REFC through the second sampling switch SAMSW2.

In the second analog-to-digital conversion period ADCP2, the switch matrix 360 and the analog-to-digital converter 380 may sequentially convert the second sensing voltages VSEN2 of the even-numbered sensing lines SL2, . . . , SL2N sampled by the sensing channels 340-1, . . . , 340-N, or CH1, CH2, . . . , CHN into the second sensing data. The second electrode of the sampling capacitor SAMC and the second electrode of the reference capacitor REFC may have a second voltage difference VSEN2−VINT in which the initialization voltage VINT is subtracted from the second sensing voltage VSEN2. The switch matrix 360 may respectively connect the second electrode of the sampling capacitor SAMC and the second electrode of the reference capacitor REFC to the first input terminal and the second input terminal of the analog-to-digital converter 380, and the analog-to-digital converter 380 may convert the second voltage difference VSEN2−VINT into the second sensing data. Analog-to-digital conversion operations by the switch matrix 360 and the analog-to-digital converter 380 may be sequentially performed from the first sensing channel 340-1 or CH1 to the $N^{th}$ sensing channel 340-N or CHN.

The data output unit 390 may sequentially store the second sensing data generated by the analog-to-digital converter 380 in the second analog-to-digital conversion period ADCP2.

In the data output period DOP, the data output unit 390 may output the first sensing data generated in the first sub-sensing period SUBP1 and the second sensing data generated in the second sub-sensing period SUBP2. For example, as shown in FIG. 13, the first sensing data SD1, SD3, . . . , SD2N−1 on the odd-numbered sensing lines SL1, . . . , SL2N−1 may be generated in the first sub-sensing period SUBP1, and the second sensing data SD2, SD4, . . . , SD2N on the even-numbered sensing lines SL2, . . . , SL2N may be generated in the second sub-sensing period SUBP2. In an embodiment, the data output unit 390 may rearrange the first sensing data SD1, SD3, . . . , SD2N−1 and the second sensing data SD2, SD4, . . . , SD2N, may output the rearranged sensing data SD1, SD2, SD3, SD4, . . . , SD2N−1, SD2N. For example, the data output unit 390 may output the sensing data SD1, SD2, SD3, SD4, . . . , SD2N−1, SD2N rearranged in the order of the sensing data SD1 for the first sensing line SL1, the sensing data SD2 for the second sensing line SL2, the sensing data for the third sensing line SD3, the sensing data for the fourth sensing line SD4, . . . , the $2N-1^{th}$ sensing data SD2N−1 for the 2N−1th sensing line SL2N−1, and the $2N^{th}$ sensing data SD2N for the $2N^{th}$ sensing line SL2N.

FIG. 5 shows an embodiment in which each of the scan signal SC and the sensing signal SS transitions from a turn-on voltage level to a turn-off voltage level within the second analog-to-digital conversion period ADCP2, however, the present disclosure is not limited thereto. In an embodiment, each of the scan signal SC and the sensing signal SS may transition from the turn-on voltage level to the turn-off voltage level within a period from the start of the first analog-to-digital conversion period ADCP1 to the end of the second analog-to-digital conversion period ADCP2.

Figure 14:
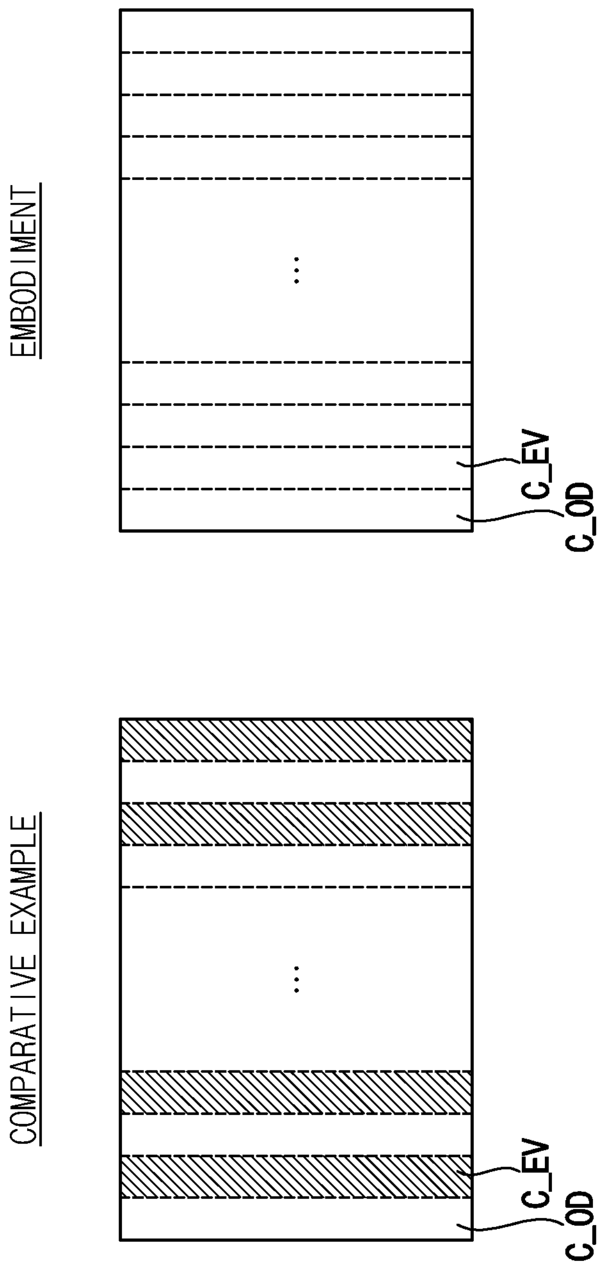
FIG. 14 is a diagram showing an image displayed by a display device according to a comparative example and an embodiment of the present disclosure.

FIG. 14 is a diagram showing an image displayed by a display device according to a comparative example and an embodiment of the present disclosure.

Referring to FIG. 14, the controller may generate the output image data provided to odd-numbered pixel columns C_OD by compensating for the input image data based on the first sensing data, and may generate the output image data provided to even-numbered pixel columns C_EV by compensating for the input image data based on the second sensing data. In a comparative example of the present disclosure, as an offset between the first sensing data and the second sensing data occurs, an offset between the output image data provided to the odd-numbered pixel columns C_OD and the output image data provided to the even-numbered pixel columns C_EV may occur. Accordingly, the input image data may not be accurately compensated based on the sensing data, and vertical lines may be visible in an image displayed by the display device. However, in an embodiment of the present disclosure, as the offset between the first sensing data and the second sensing data decreases, the offset between the output image data provided to the odd-numbered pixel columns C_OD and the output image data provided to the even-numbered pixel columns C_EV may be reduced. Accordingly, the input image data may be accurately compensated based on the sensing data, and the vertical lines may not be visible in the image displayed by the display device.

Figure 15:
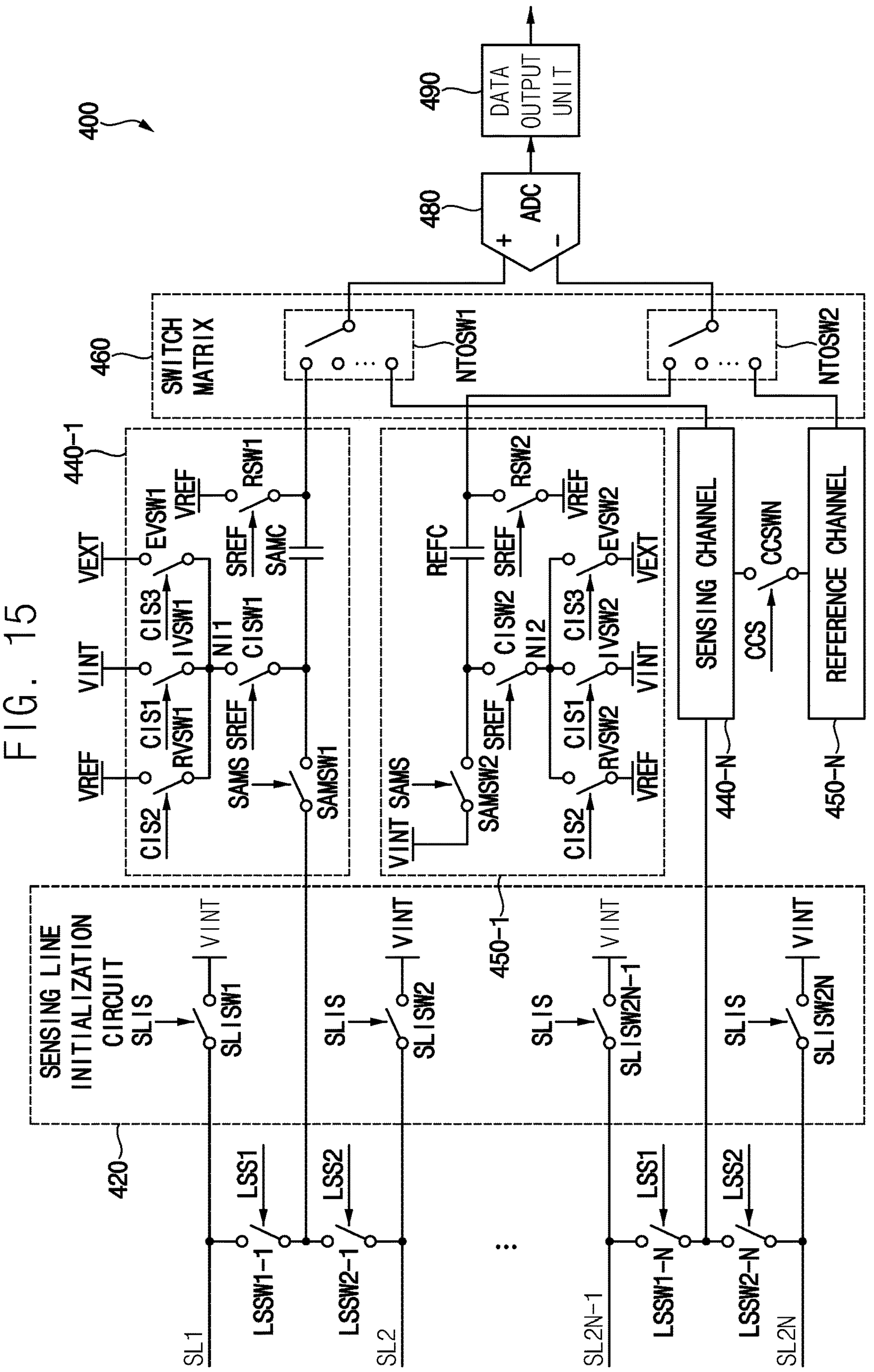
FIG. 15 is a block diagram showing a sensing driver according to an embodiment of the present disclosure.

FIG. 15 is a block diagram showing a sensing driver 400 according to an embodiment of the present disclosure. The sensing driver 400 of FIG. 15 may correspond to the sensing driver 140 included in the display device 100 of FIG. 1.

Referring to FIG. 15, the sensing driver 400 may perform a sensing operation on 2N sensing lines SL1, SL2, . . . , SL2N−1, SL2N. The sensing driver 400 may include N first line selection switches LSSW1-1, . . . , LSSW1-N, N second line selection switches LSSW2-1, . . . , LSSW2-N, a sensing line initialization circuit 420, N sensing channels 440-1, . . . , 440-N, N reference channels 450-1, . . . , 450-N, a switch matrix 460, an analog-to-digital converter 480, and a data output unit 490. Description of components of the sensing driver 400 described with reference to FIG. 15, which are substantially the same as or similar to those of the sensing driver 300 described with reference to FIG. 3, will be omitted.

In an embodiment, each of the sensing channels 440-1, . . . , 440-N may include a sampling capacitor SAMC, a first sampling switch SAMSW1, a first reference switch RSW1, a first initialization voltage switch IVSW1, a first reference voltage switch RVSW1, a first external voltage switch EVSW1, and a first capacitor initialization switch CISW1. For example, the first reference voltage switch RVSW1 may apply the reference voltage VREF to the first intermediate node NI1 in response to a second capacitor initialization signal CIS2. The first external voltage switch EVSW1 may apply an external voltage VEXT to the first intermediate node NI1 in response to a third capacitor initialization signal CIS3.

A voltage of having a first initialization level may be applied to the first electrode of the sampling capacitor SAMC in the first capacitor initialization period of the first sub-sensing period, and a voltage having a second initialization level different from the first initialization level may be applied to the first electrode of the sampling capacitor SAMC in the second capacitor initialization period of the second sub-sensing period. In an embodiment, the second initialization level may be higher than the first initialization level. In an embodiment, the initialization voltage VINT may have a first voltage level LV1 in FIG. 16 in the first sub-sensing period, and may have a second voltage level LV2 in FIG. 16 different from the first voltage level LV1 in the second capacitor initialization period and the second sampling period of the second sub-sensing period. The reference voltage VREF may have a third voltage level LV3 in FIG. 16 in the first sub-sensing period, and may have a fourth voltage level LV4 in FIG. 16 different from the third voltage level LV3 in the second capacitor initialization period and the second sampling period of the second sub-sensing period. The external voltage VEXT may have a fifth voltage level LV5 in FIG. 16 in the first sub-sensing period, and may have a sixth voltage level LV6 in FIG. 16 different from the fifth voltage level LV5 in the second capacitor initialization period and the second sampling period of the second sub-sensing period.

In an embodiment, each of the reference channels 450-1, . . . , 450-N may include a reference capacitor REFC, a second sampling switch SAMSW2, a second reference switch RSW2, a second initialization voltage switch IVSW2, a second reference voltage switch RVSW2, a second external voltage switch EVSW2, and a second capacitor initialization switch CISW2. For example, the second reference voltage switch RVSW2 may apply the reference voltage VREF to the second intermediate node NI2 in response to the second capacitor initialization signal CIS2. The second external voltage switch EVSW2 may apply the external voltage VEXT to the second intermediate node NI2 in response to the third capacitor initialization signal CIS3.

Figure 16:
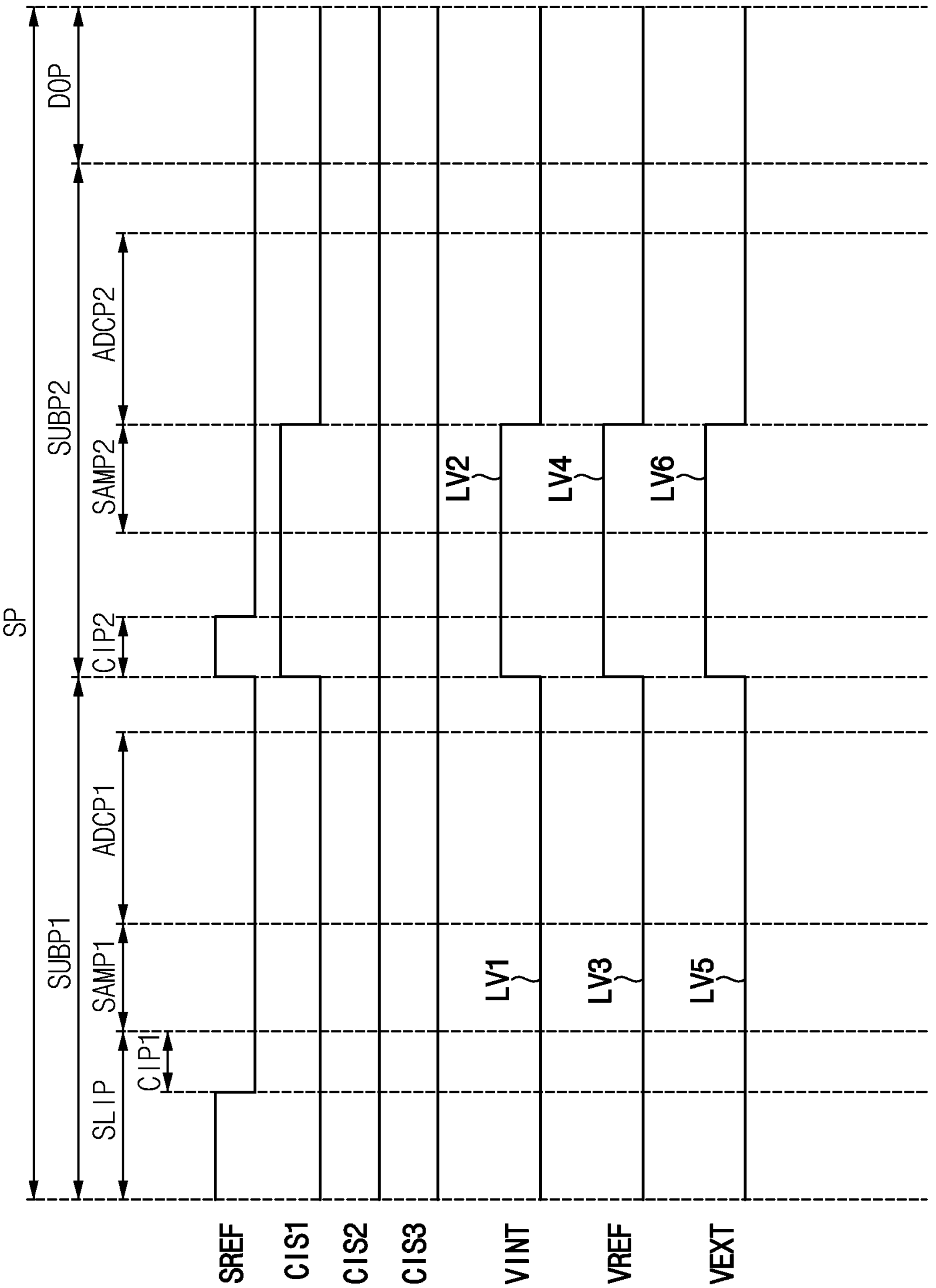
FIG. 16 is a timing diagram for describing an operation of a sensing driver according to an embodiment of the present disclosure.
Figure 17:
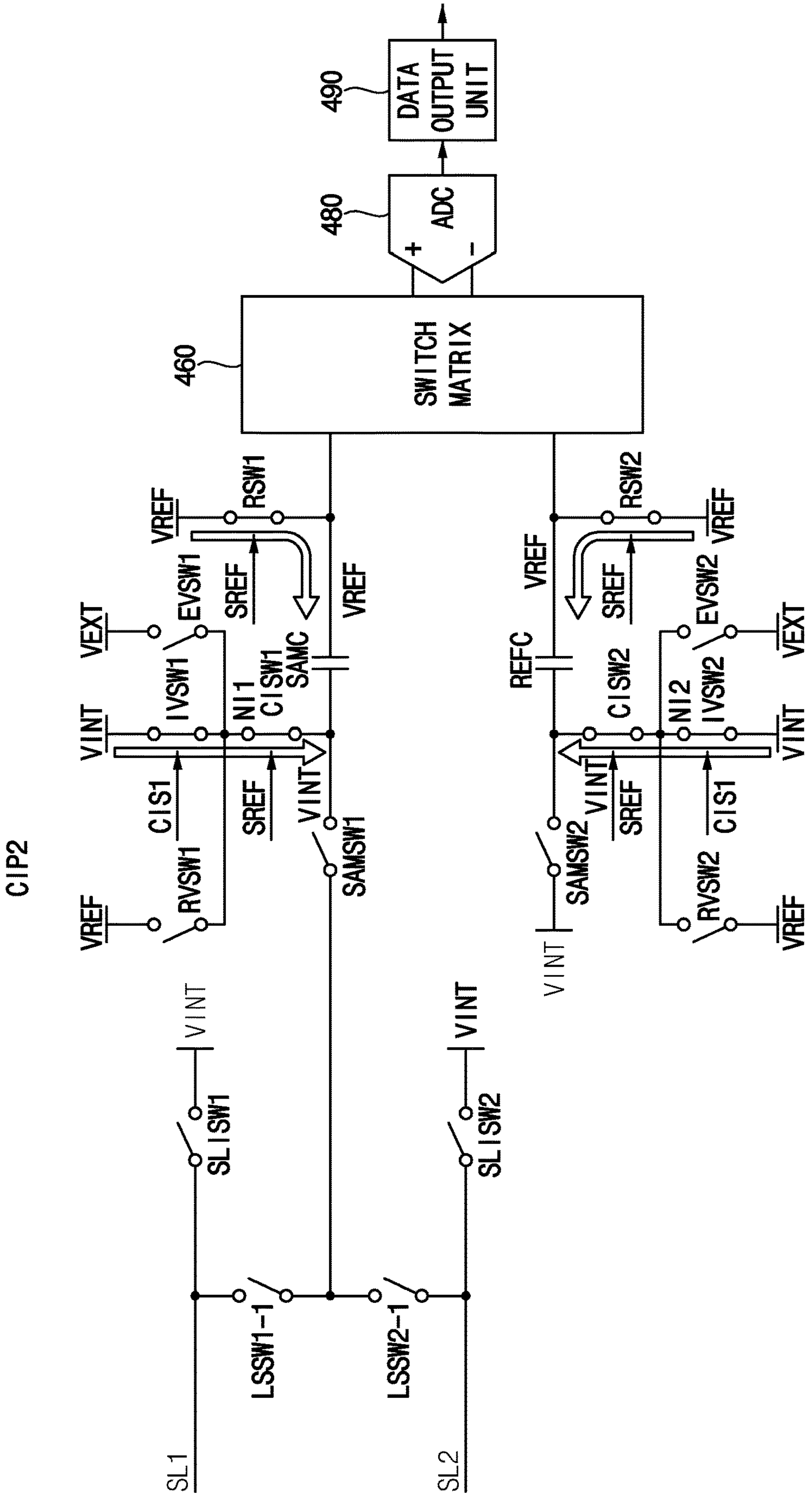
FIG. 17 is a diagram for describing an operation of the sensing driver in a second capacitor initialization period.

FIG. 16 is a timing diagram for describing an operation of the sensing driver 400 according to an embodiment of the present disclosure. FIG. 17 is a diagram for describing an operation of the sensing driver 400 in the second capacitor initialization period CIP2.

Description of steps of the operation of the sensing driver 400 described with reference to FIGS. 16 and 17, which are substantially the same as or similar to those of the operation of the sensing driver 300 described with reference to FIGS. 5 to 13, will be omitted.

Referring to FIGS. 16 and 17, in the second capacitor initialization period CIP2, the sampling capacitor SAMC and the reference capacitor REFC may be initialized. For example, in the second capacitor initialization period CIP2, the first capacitor initialization signal CIS1 and the reference signal SREF may have an activation level, and the second capacitor initialization signal CIS2 and the third capacitor initialization signal CIS3 may have a deactivation level. The first initialization voltage switch IVSW1 and the second initialization voltage switch IVSW2 may be turned on in response to the first capacitor initialization signal CIS1 having the activation level, and the first capacitor initialization switch CISW1 and the second capacitor initialization switch CISW2 may be turned on in response to the reference signal SREF having the activation level. Accordingly, the initialization voltage VINT having the second voltage level VL2 may be applied to the first electrode of the sampling capacitor SAMC through the first initialization voltage switch IVSW1 and the first capacitor initialization switch CISW1, and may be applied to the first electrode of the reference capacitor REFC through the second initialization voltage switch IVSW2 and the second capacitor initialization switch CISW2. Accordingly, the sampling capacitor SAMC and the reference capacitor REFC may be initialized or discharged based on the initialization voltage VINT having the second voltage level VL2.

Figure 18:
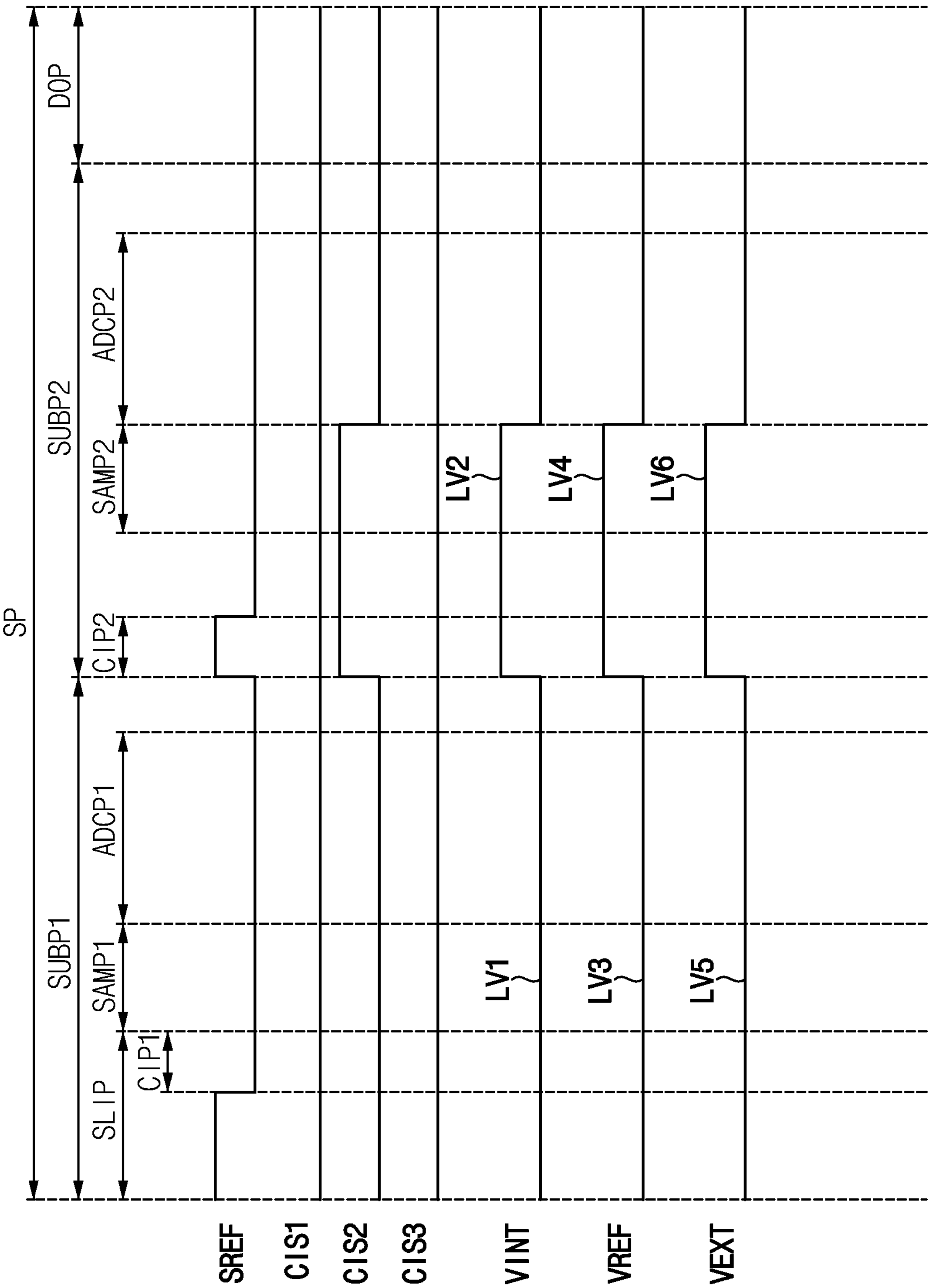
FIG. 18 is a timing diagram for describing an operation of a sensing driver according to an embodiment of the present disclosure.
Figure 19:
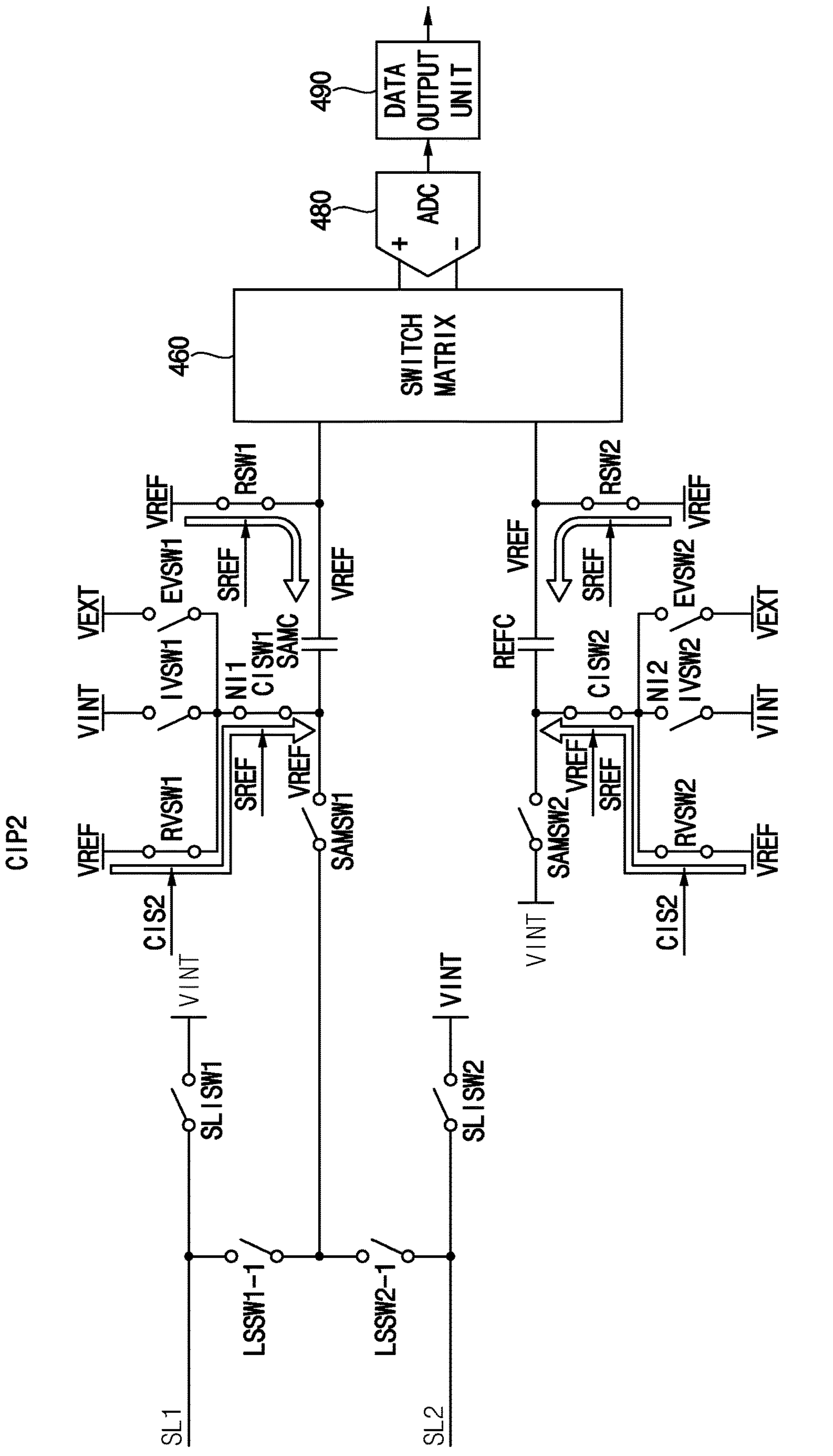
FIG. 19 is a diagram for describing an operation of the sensing driver in a second capacitor initialization period.

FIG. 18 is a timing diagram for describing an operation of the sensing driver 400 according to an embodiment of the present disclosure. FIG. 19 is a diagram for describing an operation of the sensing driver 400 in the second capacitor initialization period CIP2.

Description of steps of the operation of the sensing driver 400 described with reference to FIGS. 18 and 19, which are substantially the same as or similar to the those of the operation of the sensing driver 300 described with reference to FIGS. 5 to 13, will be omitted.

Referring to FIGS. 18 and 19, in the second capacitor initialization period CIP2, the sampling capacitor SAMC and the reference capacitor REFC may be initialized. For example, in the second capacitor initialization period CIP2, the second capacitor initialization signal CIS2 and the reference signal SREF may have an activation level, and the first capacitor initialization signal CIS1 and the third capacitor initialization signal CIS3 may have a deactivation level. The first reference voltage switch RVSW1 and the second reference voltage switch RVSW2 may be turned on in response to the second capacitor initialization signal CIS2 having the activation level, and the first capacitor initialization switch CISW1 and the second capacitor initialization switch CISW2 may be turned on in response to the reference signal SREF having the activation level. Accordingly, the reference voltage VREF having the fourth voltage level VL4 may be applied to the first electrode of the sampling capacitor SAMC through the first reference voltage switch RVSW1 and the first capacitor initialization switch CISW1, and may be applied to the first electrode of the reference capacitor REFC through the second reference voltage switch RVSW2 and the second capacitor initialization switch CISW2. Accordingly, the sampling capacitor SAMC and the reference capacitor REFC may be initialized or discharged based on the reference voltage VREF having the fourth voltage level VL4.

Figure 20:
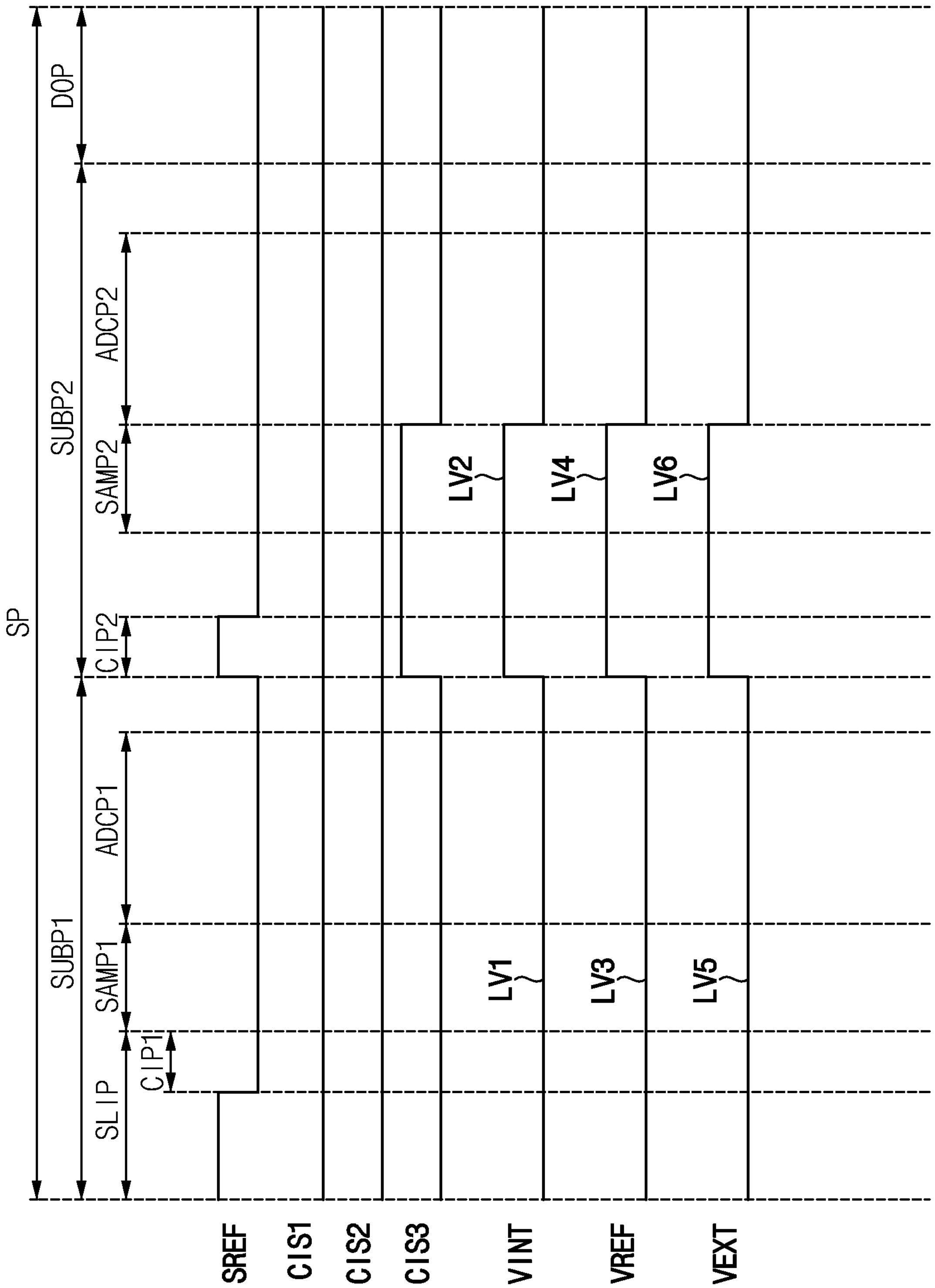
FIG. 20 is a timing diagram for describing an operation of a sensing driver according to an embodiment of the present disclosure.
Figure 21:
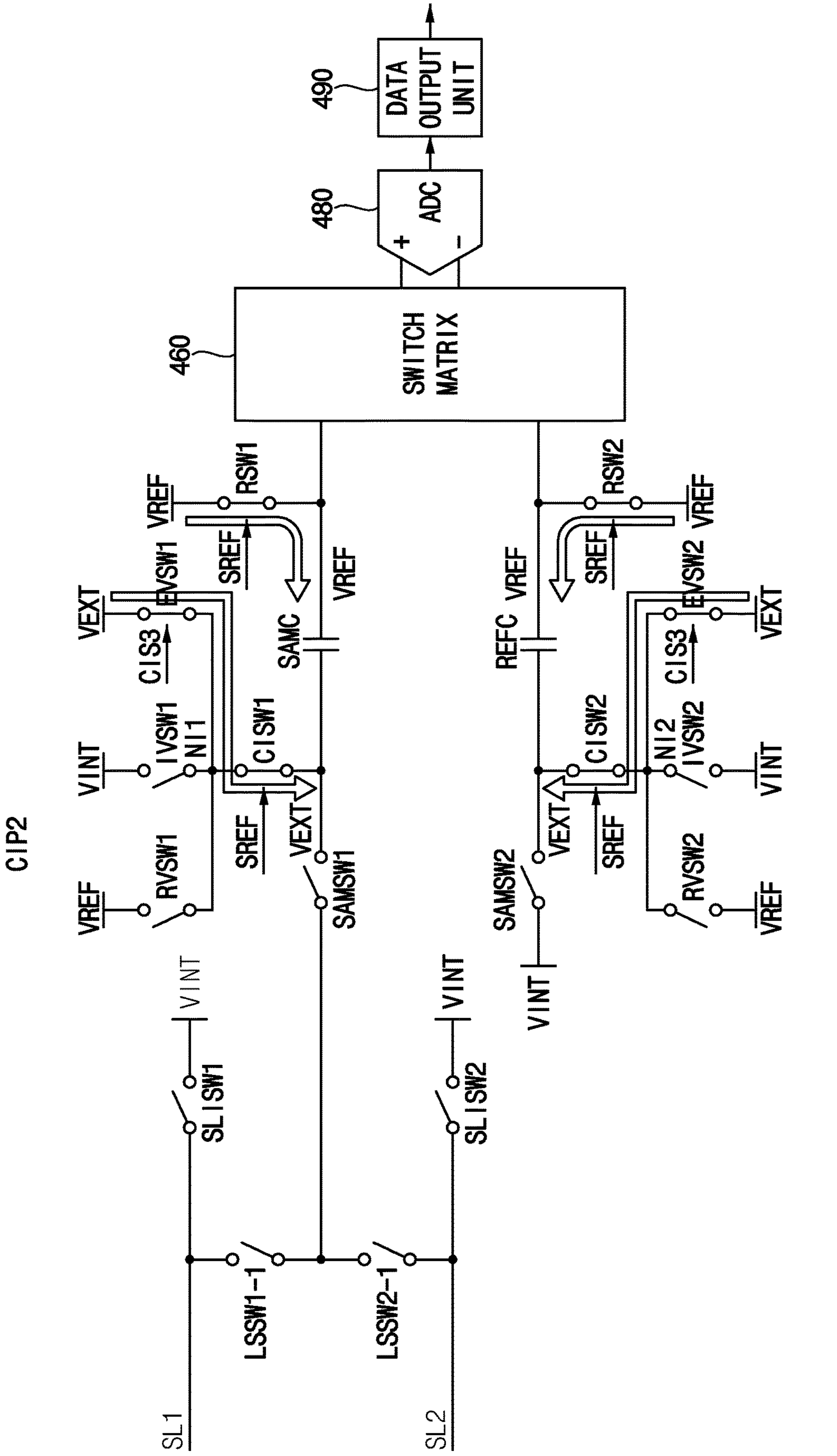
FIG. 21 is a diagram for describing an operation of the sensing driver in a second capacitor initialization period.

FIG. 20 is a timing diagram for describing an operation of the sensing driver 400 according to an embodiment of the present disclosure. FIG. 21 is a diagram for describing an operation of the sensing driver 400 in the second capacitor initialization period CIP2.

Description of steps of the operation of the sensing driver 400 described with reference to FIGS. 20 and 21, which are substantially the same as or similar to those of the operation of the sensing driver 300 described with reference to FIGS. 5 to 13, will be omitted.

Referring to FIGS. 20 and 21, in the second capacitor initialization period CIP2, the sampling capacitor SAMC and the reference capacitor REFC may be initialized. For example, in the second capacitor initialization period CIP2, the third capacitor initialization signal CIS3 and the reference signal SREF may have an activation level, and the first capacitor initialization signal CIS1 and the second capacitor initialization signal CIS2 may have a deactivation level. The first external voltage switch EVSW1 and the second external voltage switch EVSW2 may be turned on in response to the third capacitor initialization signal CIS3 having the activation level, and the first capacitor initialization switch CISW1 and the second capacitor initialization switch CISW2 may be turned on in response to the reference signal SREF having the activation level. Accordingly, the external voltage VEXT having the sixth voltage level VL6 may be applied to the first electrode of the sampling capacitor SAMC through the first external voltage switch EVSW1 and the first capacitor initialization switch CISW1, and may be applied to the first electrode of the reference capacitor REFC through the second external voltage switch EVSW2 and the second capacitor initialization switch CISW2. Accordingly, the sampling capacitor SAMC and the reference capacitor REFC may be initialized or discharged based on the external voltage VEXT having the sixth voltage level VL6.

Figure 22:
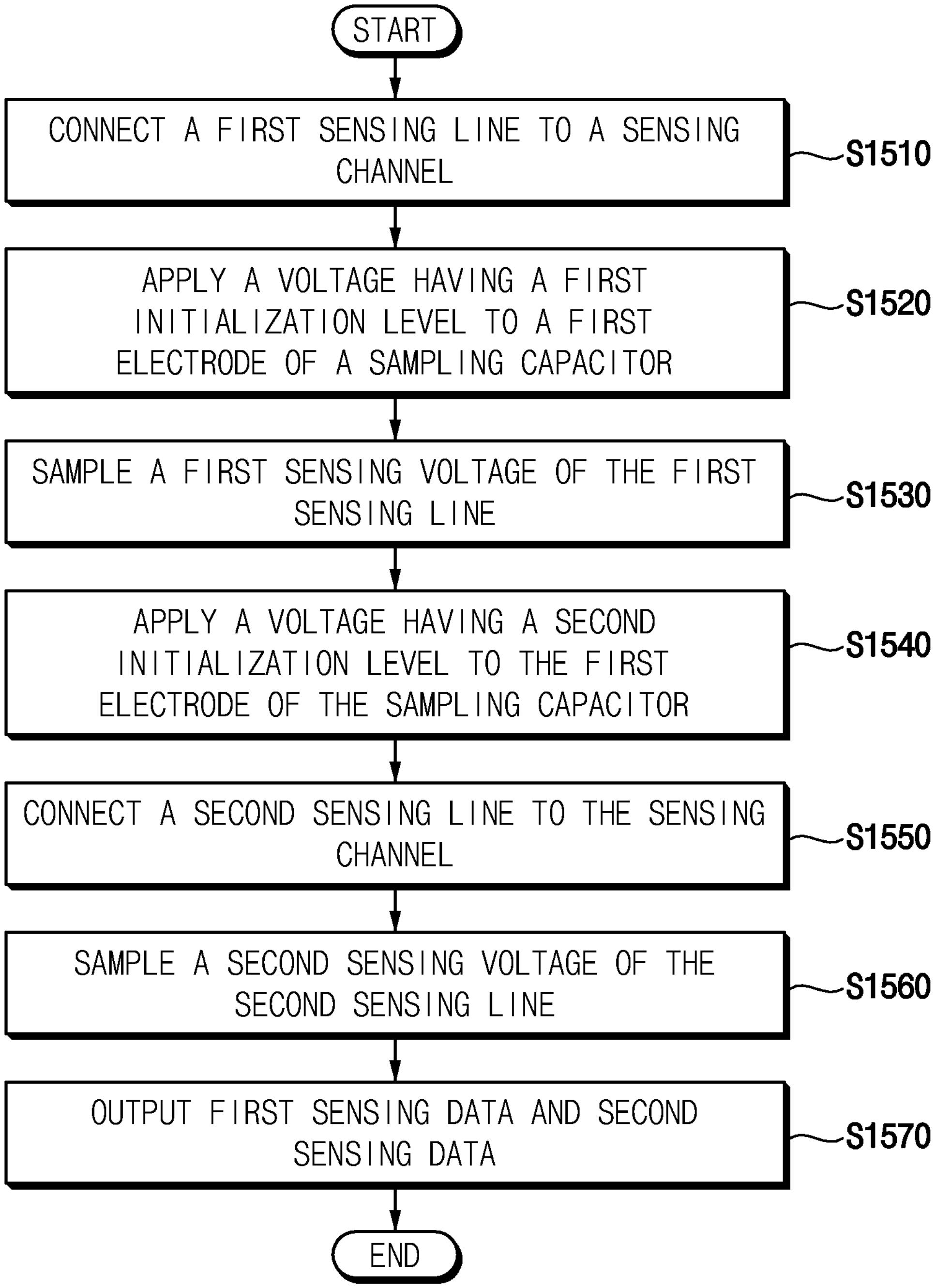
FIG. 22 is a flowchart showing a method of driving a sensing driver according to an embodiment of the present disclosure.

FIG. 22 is a flowchart showing a method of driving a sensing driver according to an embodiment of the present disclosure.

Referring to FIGS. 3, 5, 15, 16, 18, 20, and 22, in a method of driving the sensing drivers 300 and 400, the sensing period SP may include the first sub-sensing period SUBP1 in which the first sensing operations on the odd-numbered sensing lines SL1, . . . , SL2N−1 including the first sensing line SL1 are performed, the second sub-sensing period SUBP2 in which the second sensing operations on the even-numbered sensing lines SL2, . . . , SL2N including the second sensing line SL2 are performed, and the data output period DOP in which the sensing data is output. The first sub-sensing period SUBP1 may include the first capacitor initialization period CIP1 and the first sampling period SAMP1, and the second sub-sensing period SUBP2 may include the second capacitor initialization period CIP2 and the second sampling period SAMP2. Hereinafter, for convenience of description, the first sensing operation on the first sensing line SL1 among the odd-numbered sensing lines SL1, . . . , SL2N−1 and the second sensing operation on the sensing line SL2 among the even-numbered sensing lines SL2, . . . , SL2N will be described.

In the first sub-sensing period SUBP1, the first line selection switch LSSW1-1 may connect the first sensing line SL1 to the sensing channel 340-1 and 440-1 in an operation S1510. For example, the first line selection signal LSS1 may have an activation level in the first sampling period SAMP1, and the first line selection switch LSSW1-1 may connect the first sensing line SL1 to the sensing channel 340-1 and 440-1 in response to the first line selection signal LSS1 having the activation level.

In the first capacitor initialization period CIP1, the sensing channel 340-1 and 440-1 and the reference channel 350-1 and 450-1 may apply the voltage having the first initialization level to the first electrode of the sampling capacitor SAMC and the first electrode of the reference capacitor REFC in an operation S1520. In an embodiment, in the first capacitor initialization period CIP1, the sensing channel 340-1 and 440-1 and the reference channel 350-1 and 450-1 may apply the initialization voltage VINT having the first voltage level LV1 to the first electrode of the sampling capacitor SAMC and the first electrode of the reference capacitor REFC. Accordingly, the sampling capacitor SAMC and the reference capacitor REFC may be initialized or discharged based on the initialization voltage VINT having the first voltage level VL1.

In the first sampling period SAMP1, the voltage of the first sensing line SL1 may be saturated with the first sensing voltage VSEN1, and the sensing channel 340-1 and 440-1 may sample the first sensing voltage VSEN1 of the first sensing line SL1 in an operation S1530. The sampling capacitor SAMC may store the first sensing voltage VSEN1. The first sensing voltage VSEN1 sampled by the sensing channel 340-1 and 440-1 may be provided to the analog-to-digital converters 380 and 480, and the analog-to-digital converters 380 and 480 may convert the first sensing voltage VSEN1 into the first sensing data.

In the second capacitor initialization period CIP2, the sensing channel 340-1 and 440-1 and the reference channel 350-1 and 450-1 may apply the voltage having the second initialization level to the first electrode of the sampling capacitor SAMC and the first electrode of the reference capacitor REFC in an operation S1540. In an embodiment, in the second capacitor initialization period CIP2, the sensing channel 340-1 and 440-1 and the reference channel 350-1 and 450-1 may apply the initialization voltage VINT having the second voltage level LV2, the reference voltage VREF having the fourth voltage level LV4, or the external voltage VEXT having the sixth voltage level LV6 to the first electrode of the sampling capacitor SAMC and the first electrode of the reference capacitor REFC. Accordingly, the sampling capacitor SAMC and the reference capacitor REFC may be initialized or discharged based on the initialization voltage VINT having the second voltage level VL2, the reference voltage VREF having the fourth voltage level LV4, or the external voltage VEXT having the sixth voltage level LV6.

In the second sub-sensing period SUBP2, the second line selection switch LSSW2-1 may connect the second sensing line SL2 to the sensing channel 340-1 and 440-1 in an operation S1550. For example, the second line selection signal LSS2 may have an activation level in the second sampling period SAMP2, and the second line selection switch LSSW2-1 may connect the second sensing line SL2 to the sensing channel 340-1 and 440-1 in response to the second line selection signal LSS2 having the activation level.

In the second sampling period SAMP2, the voltage of the second sensing line SL2 may be saturated with the second sensing voltage VSEN2, and the sensing channel 340-1 and 440-1 may sample the second sensing voltage VSEN2 of the second sensing line SL2 in an operation S1560. The sampling capacitor SAMC may store the second sensing voltage VSEN2. The second sensing voltage VSEN2 sampled by the sensing channel 340-1 and 440-1 may be provided to the analog-to-digital converter 380 and 480, and the analog-to-digital converter 380 and 480 may convert the second sensing voltage VSEN2 into the second sensing data.

In the data output period DOP, the sensing driver 300 and 400 may output the first and second sensing data to the controller in an operation S1570. The controller may generate the output image data by compensating for the input image data based on the first and second sensing data.

In the method of driving the sensing driver 300 and 400, the second initialization level of the voltage applied to the first electrode of the sampling capacitor SAMC in the second capacitor initialization period CIP2 may be different from the first initialization level of the voltage applied to the first electrode of the sampling capacitor SAMC in the first capacitor initialization period CIP1. For example, the second initialization level may be higher than the first initialization level. In an embodiment, the initialization voltage VINT may have the first voltage level LV1 in the first sub-sensing period SUBP1, and may have the second voltage level LV2 in the second sub-sensing period SUBP2. The reference voltage VREF may have the third voltage level LV3 in the first sub-sensing period SUBP1, and may have the fourth voltage level LV4 in the second sub-sensing period SUBP2. The external voltage VEXT may have the fifth voltage level LV5 in the first sub-sensing period SUBP1, and may have the sixth voltage level LV6 in the second sub-sensing period SUBP2.

In an embodiment, the second initialization level (e.g., the second voltage level LV2 of the initialization voltage VINT, the fourth voltage level LV4 of the reference voltage VREF, and the sixth voltage level LV6 the external voltage VEXT) may be set before the sensing period SP. In an embodiment, the second initialization level may be set based on the first sensing voltage VSEN1 and the second sensing voltage VSEN2. For example, the second initialization level may be set to an average of the first sensing voltages VSEN1 of the odd-numbered sensing lines SL1, . . . . SL2N−1 and the second sensing voltages VSEN2 of the even-numbered sensing lines SL2, . . . , SL2N.

Figure 23:
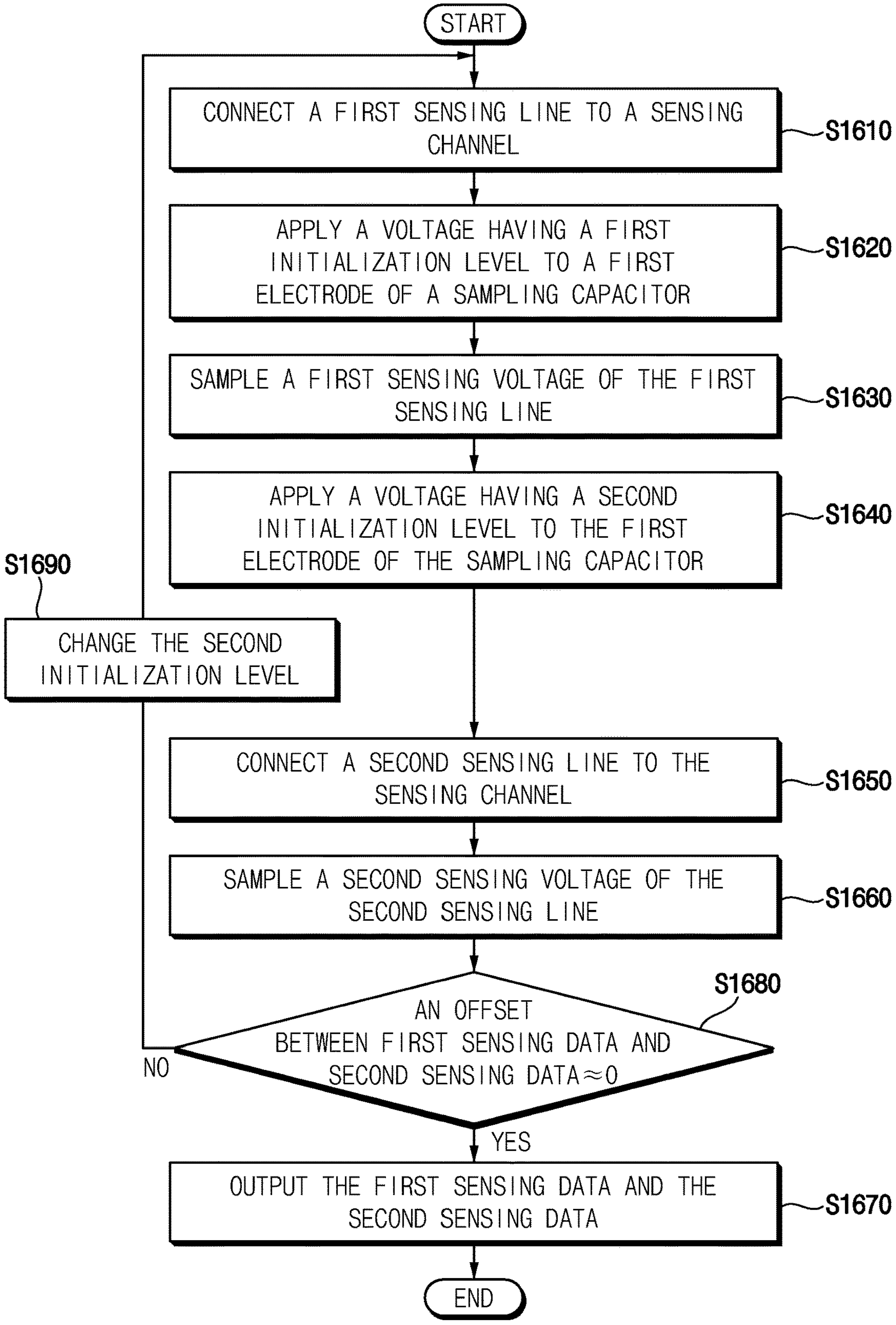
FIG. 23 is a flowchart showing a method of driving a sensing driver according to an embodiment of the present disclosure.

FIG. 23 is a flowchart showing a method of driving a sensing driver according to an embodiment of the present disclosure.

Referring to FIGS. 3, 5, 15, 16, 18, 20, and 23, in the method of driving the sensing driver 300 and 400, the sensing period SP may include the first sub-sensing period SUBP1 in which the first sensing operations on the odd-numbered sensing lines SL1, . . . , SL2N−1 including the first sensing line SL1 are performed, the second sub-sensing period SUBP2 in which the second sensing operations on the even-numbered sensing lines SL2, . . . , SL2N including the second sensing line SL2 are performed, a data comparison period in which the sensing data are compared, and the data output period DOP in which the sensing data is output. Description of operations of the method of driving the sensing driver described with reference to FIG. 23, which are substantially the same as or similar to those of the method of driving the sensing driver described with reference to FIG. 22, will be omitted.

In the data comparison period, the first sensing data and the second sensing data can be compared in an operation S1680. When the offset between the first sensing data and the second sensing data is about 0 (e.g., when a difference between the offset and 0 is within a predetermined error range), the sensing driver 300 and 400 may output the first and second sensing data to the controller in the data output period DOP in an operation S1670.

When the offset between the first sensing data and the second sensing data is not about 0 (e.g., when the difference between the offset and 0 is outside the predetermined error range), the second initialization level may be changed in an operation S1690. In an embodiment, the second voltage level LV2 of the initialization voltage VINT, the fourth voltage level LV4 of the reference voltage VREF, and the sixth voltage level LV6 of the external voltage VEXT may be changed. In an embodiment, the second initialization level (e.g., the second voltage level LV2 of the initialization voltage VINT, the fourth voltage level LV4 of the reference voltage VREF, and the sixth voltage level LV6 of the external voltage VEXT) may be increased or decreased by a predetermined amount such that the offset between the first sensing data and the second sensing data is reduced.

Figure 24:
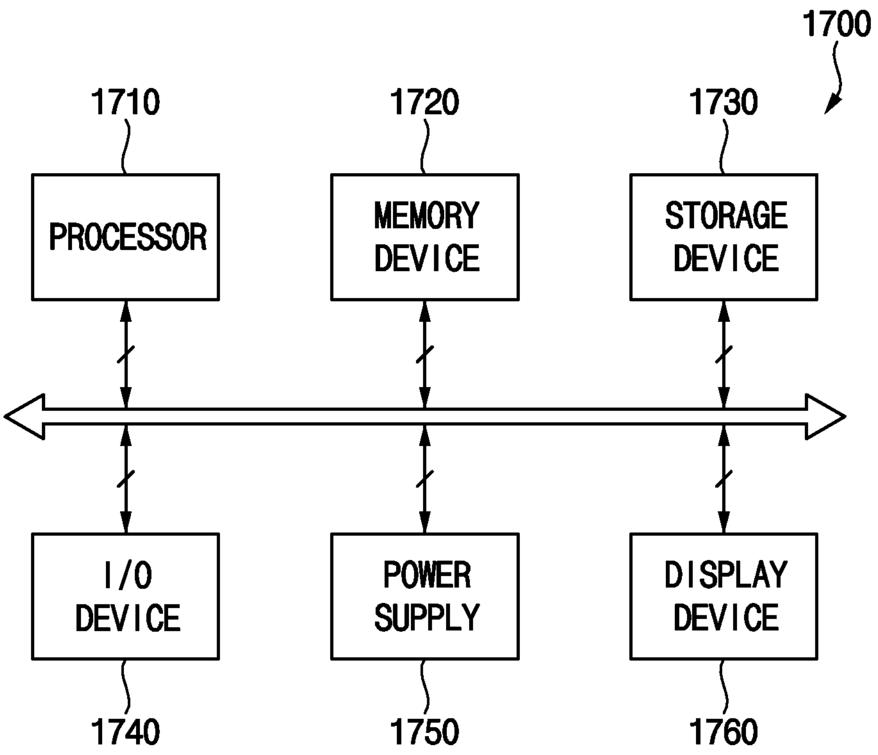
FIG. 24 is a block diagram showing an electronic apparatus including a display device according to an embodiment of the present disclosure.

FIG. 24 is a block diagram showing an electronic apparatus 1700 including a display device 1760 according to an embodiment of the present disclosure.

Referring to FIG. 24, an electronic apparatus 1700 may include a processor 1710, a memory device 1720, a storage device 1730, an input/output ("I/O") device 1740, a power supply 1750, and the display device 1760. The display device 1760 may correspond to the display device 100 of FIG. 1. The electronic apparatus 1700 may further include a plurality of ports for communicating with a video card, a sound card, a memory card, a universal serial bus ("USB") device, etc.

The processor 1710 may perform particular calculations or tasks. In an embodiment, the processor 1710 may be a microprocessor, a central processing unit ("CPU"), or the like. The processor 1710 may be coupled to other components via an address bus, a control bus, a data bus, or the like. In an embodiment, the processor 1710 may be coupled to an extended bus such as a peripheral component interconnection ("PCI") bus.

The memory device 1720 may store data for operations of the electronic apparatus 1700. In an embodiment, the memory device 1720 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1730 may include a solid state drive ("SSD") device, a hard disk drive ("HDD") device, a CD-ROM device, or the like. The I/O device 1740 may include an input device such as a keyboard, a keypad, a touchpad, a touch-screen, a mouse device, etc., and an output device such as a speaker, a printer, etc. The power supply 1750 may supply a power required for the operation of the electronic apparatus 1700. The display device 1760 may be coupled to other components via the buses or other communication links.

In the display device 1760, a second initialization level of a voltage that initializes a sampling capacitor in a second sub-sensing period may be different from a first initialization level of a voltage that initializes the sampling capacitor in a first sub-sensing period, so that an offset between first sensing data and second sensing data may be reduced. Accordingly, sensing accuracy of a sensing driver included in the display device 1760 may be improved.

The display device according to the embodiments may be applied to a display device included in a computer, a notebook, a mobile phone, a smart phone, a smart pad, a PMP, a PDA, an MP3 player, or the like.

Although the sensing drivers, the methods of driving the sensing drivers, and the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A sensing driver which performs a sensing operation on a first sensing line and a second sensing line in a sensing period including a first sub-sensing period and a second sub-sensing period, comprising:

a sensing channel which samples a first sensing voltage of the first sensing line in a first sampling period of the first sub-sensing period, samples a second sensing voltage of the second sensing line in a second sampling period of the second sub-sensing period, and includes a sampling capacitor having a first electrode and a second electrode;

a first line selection switch which connects the first sensing line to the sensing channel in the first sub-sensing period; and a second line selection switch which connects the second sensing line to the sensing channel in the second sub-sensing period, wherein a voltage having a first initialization level is applied to the first electrode of the sampling capacitor in a first capacitor initialization period of the first sub-sensing period, and wherein a voltage having a second initialization level different from the first initialization level is applied to the first electrode of the sampling capacitor in a second capacitor initialization period of the second sub-sensing period.

2. The sensing driver of claim 1, wherein the second initialization level is higher than the first initialization level.

3. The sensing driver of claim 1, wherein the second initialization level is preset before the sensing period.

4. The sensing driver of claim 1, wherein the second initialization level is set based on the first sensing voltage and the second sensing voltage.

5. The sensing driver of claim 1, wherein the sensing channel further includes:

a first sampling switch which connects the first and second selection switches to the first electrode of the sampling capacitor in response to a sampling signal;

a first reference switch which applies a reference voltage to the second electrode of the sampling capacitor in response to a reference signal;

a first initialization voltage switch which applies an initialization voltage to a first intermediate node in response to a first capacitor initialization signal; and a first capacitor initialization switch which connects the first intermediate node to the first electrode of the sampling capacitor in response to the reference signal.

6. The sensing driver of claim 5, further comprising: a reference channel, wherein the reference channel includes:

a reference capacitor which has a first electrode and a second electrode;

a second sampling switch which applies the initialization voltage to the first electrode of the reference capacitor in response to the sampling signal;

a second reference switch which applies the reference voltage to the second electrode of the reference capacitor in response to the reference signal;

a second initialization voltage switch which applies the initialization voltage to a second intermediate node in response to the first capacitor initialization signal; and a second capacitor initialization switch which connects the second intermediate node to the first electrode of the reference capacitor in response to the reference signal.

7. The sensing driver of claim 6, wherein the initialization voltage has a first voltage level in the first capacitor initialization period, and has a second voltage level different from the first voltage level in the second capacitor initialization period.

8. The sensing driver of claim 6, wherein the sensing channel further includes a first reference voltage switch which applies the reference voltage to the first intermediate node in response to a second capacitor initialization signal, and wherein the reference channel further includes a second reference voltage switch which applies the reference voltage to the second intermediate node in response to the second capacitor initialization signal.

9. The sensing driver of claim 8, wherein the reference voltage has a third voltage level in the first capacitor initialization period, and has a fourth voltage level different from the third voltage level in the second capacitor initialization period.

10. The sensing driver of claim 8, wherein the sensing channel further includes a first external voltage switch which applies an external voltage to the first intermediate node in response to a third capacitor initialization signal, and wherein the reference channel further includes a second external voltage switch which applies the external voltage to the second intermediate node in response to the third capacitor initialization signal.

11. The sensing driver of claim 10, wherein the external voltage has a fifth voltage level in the first capacitor initialization period, and has a sixth voltage level different from the fifth voltage level in the second capacitor initialization period.

12. The sensing driver of claim 1, further comprising:

a sensing line initialization circuit which simultaneously initializes the first sensing line and the second sensing line in the first sub-sensing period.

13. The sensing driver of claim 1, further comprising:

an analog-to-digital converter; and a switch matrix which connects the sensing channel to the analog-to-digital converter.

14. The sensing driver of claim 1, wherein the sensing period includes:

the first sub-sensing period in which a first sensing operation on the first sensing line is performed;

the second sub-sensing period in which a second sensing operation on the second sensing line is performed; and a data output period in which first sensing data corresponding to the first sensing voltage and second sensing data corresponding to the second sensing voltage is output, wherein the first sub-sensing period includes:

a sensing line initialization period in which the first sensing line and the second sensing line are simultaneously initialized;

the first capacitor initialization period in which the sampling capacitor is initialized;

the first sampling period in which the first sensing voltage is sampled; and a first analog-to-digital conversion period in which the first sensing voltage is converted into the first sensing data, wherein the second sub-sensing period includes:

the second capacitor initialization period in which the sampling capacitor is initialized;

the second sampling period in which the second sensing voltage is sampled; and a second analog-to-digital conversion period in which the second sensing voltage is converted into the second sensing data.

15. The sensing driver of claim 1, wherein the sensing driver performs a sensing operation on N odd-numbered sensing lines, where N is a natural number greater than or equal to 2, including the first sensing line and N even-numbered sensing lines including the second sensing line in the sensing period, wherein the sensing driver comprises:

N sensing channels which include the sensing channel;

N first line selection switches which connect the N odd-numbered sensing lines to the N sensing channels in the first sub-sensing period;

N second line selection switches which connect the N even-numbered sensing lines to the N sensing channels in the second sub-sensing period;

an analog-to-digital converter; and a switch matrix which sequentially connects the N sensing channels to the analog-to-digital converter in a first analog-to-digital conversion period of the first sub-sensing period, and sequentially connects the N sensing channels to the analog-to-digital converter in a second analog-to-digital conversion period of the second sub-sensing period, and wherein the analog-to-digital converter sequentially converts N first sensing voltages of the N odd-numbered sensing lines into N first sensing data in the first analog-to-digital conversion period, and sequentially converts N second sensing voltages of the N even-numbered sensing lines into N second sensing data in the second analog-to-digital conversion period.

16. The sensing driver of claim 15, wherein the second initialization level is set as an average of the N first sensing voltages and the N second sensing voltages.

17. The sensing driver of claim 15, further comprising:

a data output unit which sequentially stores the N first sensing data in the first analog-to-digital conversion period, sequentially stores the N second sensing data in the second analog-to-digital conversion period, and outputs the N first sensing data and the N second sensing data in a data output period of the sensing period.

18. The sensing driver of claim 17, wherein the data output unit rearranges the N first sensing data and the N second sensing data such that each of the N second sensing data is disposed between adjacent two of the N first sensing data.

19. A method of driving a sensing driver which performs a sensing operation on a first sensing line and a second sensing line in a sensing period including a first sub-sensing period and a second sub-sensing period, the method comprising:

connecting the first sensing line to a sensing channel in the first sub-sensing period;

applying a voltage having a first initialization level to a first electrode of a sampling capacitor of the sensing channel in a first capacitor initialization period of the first sub-sensing period;

sampling a first sensing voltage of the first sensing line in a first sampling period of the first sub-sensing period;

applying a voltage having a second initialization level different from the first initialization level to the first electrode of the sampling capacitor in a second capacitor initialization period of the second sub-sensing period;

connecting the second sensing line to the sensing channel in the second sub-sensing period; and sampling a second sensing voltage of the second sensing line in a second sampling period of the second sub-sensing period.

20. The method of claim 19, wherein the second initialization level is higher than the first initialization level.

21. The method of claim 19, wherein the second initialization level is preset before the sensing period.

22. The method of claim 19, wherein the second initialization level is set based on the first sensing voltage and the second sensing voltage.

23. A display device, comprising:

a display panel which includes a first pixel and a second pixel;

a scan driver which provides a scan signal and a sensing signal to each of the first and second pixels;

a data driver which provides a data signal to each of the first and second pixels; and a sensing driver which performs a sensing operation on a first sensing line connected to the first pixel and a second sensing line connected to the second pixel in a sensing period including a first sub-sensing period and a second sub-sensing period, wherein the sensing driver includes:

a sensing channel which samples a first sensing voltage of the first sensing line in a first sampling period of the first sub-sensing period, samples a second sensing voltage of the second sensing line in a second sampling period of the second sub-sensing period, and includes a sampling capacitor;

a first line selection switch which connects the first sensing line to the sensing channel in the first sub-sensing period; and a second line selection switch which connects the second sensing line to the sensing channel in the second sub-sensing period, wherein a voltage having a first initialization level is applied to a first electrode of the sampling capacitor in a first capacitor initialization period of the first sub-sensing period, and wherein a voltage having a second initialization level different from the first initialization level is applied to the first electrode of the sampling capacitor in a second capacitor initialization period of the second sub-sensing period.

* * * * *